(12) United States Patent
Duelli et al.

(10) Patent No.: US 10,999,524 B1
(45) Date of Patent: May 4, 2021

(54) TEMPORAL HIGH DYNAMIC RANGE IMAGING USING TIME-OF-FLIGHT CAMERAS

(71) Applicant: Amazon Technologies, Inc., Seattle, WA (US)

(72) Inventors: Markus Stefan Duelli, Seattle, WA (US); Cory Keitz, Seattle, WA (US); Lorenzo Sorgi, Seattle, WA (US); Christopher Samuel Zakian, Brier, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/020,272

(22) Filed: Jun. 27, 2018

Related U.S. Application Data

(60) Provisional application No. 62/656,889, filed on Apr. 12, 2018.

(51) Int. Cl.
| | |
|---|---|
| *H04N 5/235* | (2006.01) |
| *G01S 7/486* | (2020.01) |
| *G01S 17/89* | (2020.01) |
| *G06T 7/521* | (2017.01) |
| *G01S 17/894* | (2020.01) |

(Continued)

(52) U.S. Cl.
CPC .......... *H04N 5/2355* (2013.01); *G01S 7/497* (2013.01); *G01S 17/894* (2020.01); *G06T 7/521* (2017.01); *H04N 5/2352* (2013.01); *H04N 5/2354* (2013.01); *G06T 2207/10152* (2013.01); *G06T 2207/20208* (2013.01); *H04N 13/271* (2018.05)

(58) Field of Classification Search
CPC .......... G01B 11/22; G06T 19/00; G06T 7/50; G06T 7/521; G06T 2207/10152; G06T 2207/20208; H04N 13/128; H04N 5/2354; H04N 5/2355; H04N 13/271; G01S 7/497; G01S 17/894

See application file for complete search history.

(56) References Cited

U.S. PATENT DOCUMENTS

| | | | |
|---|---|---|---|
| 6,035,717 A | * | 3/2000 | Carodiskey ............ G01B 17/02 73/597 |
| 7,225,980 B2 | | 6/2007 | Ku et al. |

(Continued)

OTHER PUBLICATIONS

Time of flight optical ranging sensor based on a current assisted photonic demodulator; 2006; (Year: 2006).*

(Continued)

*Primary Examiner* — Luis Perez-Fuentes
(74) *Attorney, Agent, or Firm* — Athorus, PLLC

(57) ABSTRACT

A time-of-flight camera may be used to generate depth images of a scene, where the scene includes retroreflective materials. The time-of-flight camera may capture first sensor data by illuminating the scene at a first energy level, and by exposing a sensor for a first duration. If portions of the sensor are saturated by light reflected from retroreflective materials, corrupted pixels are detected within the first sensor data. A second set of sensor data may be captured by illuminating the scene at a second energy level, or by exposing the sensor for a second duration. The corrupted pixels may be identified and masked from the first sensor data, which may be blended with corresponding portions of the second sensor data to generate a depth image.

13 Claims, 18 Drawing Sheets

(51) Int. Cl.
   *G01S 7/497*   (2006.01)
   *H04N 13/271*  (2018.01)

(56) References Cited

U.S. PATENT DOCUMENTS

| | | | |
|---|---|---|---|
| 7,362,419 B2* | 4/2008 | Kurihara | G01S 7/493 356/4.07 |
| 7,405,812 B1 | 7/2008 | Bamji | |
| 7,949,568 B2 | 5/2011 | Fano et al. | |
| 8,009,864 B2 | 8/2011 | Linaker et al. | |
| 8,175,925 B1 | 5/2012 | Rouaix | |
| 8,189,855 B2 | 5/2012 | Opalach et al. | |
| 8,423,431 B1 | 4/2013 | Rouaix et al. | |
| 8,630,924 B2 | 1/2014 | Groenevelt et al. | |
| 8,688,598 B1 | 4/2014 | Shakes et al. | |
| 9,103,663 B2* | 8/2015 | Min | G01B 11/026 |
| 9,473,747 B2 | 10/2016 | Kobres et al. | |
| 9,894,347 B2* | 2/2018 | Yoon | G01S 17/894 |
| 9,897,698 B2* | 2/2018 | Boufounos | G01S 17/894 |
| 10,165,257 B2* | 12/2018 | Seshadrinathan | G06K 9/6212 |
| 10,368,053 B2* | 7/2019 | Martinez Bauza | G06T 5/50 |
| 10,473,785 B2* | 11/2019 | Kubota | G01S 7/4873 |
| 2003/0002712 A1 | 1/2003 | Steenburgh et al. | |
| 2004/0181467 A1 | 9/2004 | Raiyani et al. | |
| 2006/0197937 A1* | 9/2006 | Bamji | G01C 3/08 356/5.01 |
| 2008/0055087 A1 | 3/2008 | Horii et al. | |
| 2008/0077511 A1 | 3/2008 | Zimmerman | |
| 2008/0109114 A1 | 5/2008 | Orita et al. | |
| 2009/0121017 A1 | 5/2009 | Cato et al. | |
| 2009/0245573 A1 | 10/2009 | Saptharishi et al. | |
| 2011/0011936 A1 | 1/2011 | Morandi et al. | |
| 2012/0033045 A1 | 2/2012 | Schweizer et al. | |
| 2012/0177252 A1 | 7/2012 | Korekado et al. | |
| 2012/0284132 A1 | 11/2012 | Kim et al. | |
| 2013/0076898 A1 | 3/2013 | Philippe et al. | |
| 2013/0148102 A1 | 6/2013 | Oggier | |
| 2013/0169756 A1* | 7/2013 | Min | H04N 13/271 348/46 |
| 2013/0201288 A1* | 8/2013 | Billerbeck | G01S 7/4868 348/46 |
| 2013/0253700 A1 | 9/2013 | Carson et al. | |
| 2014/0055771 A1 | 2/2014 | Oggier | |
| 2014/0152974 A1 | 6/2014 | Ko | |
| 2014/0279294 A1 | 9/2014 | Field-Darragh et al. | |
| 2014/0313376 A1 | 10/2014 | Nieuwenhove et al. | |
| 2014/0362223 A1 | 12/2014 | LaCroix et al. | |
| 2015/0019391 A1 | 1/2015 | Kumar et al. | |
| 2015/0073907 A1 | 3/2015 | Purves et al. | |
| 2015/0373322 A1 | 12/2015 | Goma et al. | |
| 2016/0307325 A1 | 10/2016 | Wang et al. | |
| 2016/0309133 A1 | 10/2016 | Laroia et al. | |
| 2016/0330391 A1* | 11/2016 | Bulteel | H04N 5/35572 |
| 2017/0180658 A1* | 6/2017 | Choi | H04N 13/296 |
| 2017/0180713 A1* | 6/2017 | Trail | G01S 17/89 |
| 2017/0188019 A1 | 6/2017 | Kashyap | |
| 2017/0275023 A1 | 9/2017 | Harris et al. | |
| 2017/0323455 A1 | 11/2017 | Bittan et al. | |
| 2018/0045513 A1 | 2/2018 | Kitamura et al. | |
| 2018/0081033 A1 | 3/2018 | Demirtas et al. | |
| 2018/0259628 A1 | 9/2018 | Plank et al. | |
| 2018/0300891 A1 | 10/2018 | Wang et al. | |
| 2018/0302611 A1 | 10/2018 | Baak et al. | |
| 2018/0307310 A1* | 10/2018 | McCombe | G06T 11/00 |
| 2018/0348345 A1 | 12/2018 | Haroun et al. | |
| 2018/0350087 A1 | 12/2018 | Kowdle et al. | |
| 2019/0035099 A1 | 1/2019 | Afrouzi et al. | |
| 2019/0049962 A1 | 2/2019 | Ouellette et al. | |
| 2019/0105514 A1 | 4/2019 | Amstutz et al. | |
| 2019/0109977 A1 | 4/2019 | Dutton et al. | |
| 2019/0213895 A1 | 7/2019 | Omari et al. | |
| 2019/0227174 A1 | 7/2019 | Hitomi | |
| 2019/0317217 A1 | 10/2019 | Day et al. | |
| 2020/0077078 A1 | 3/2020 | Denenberg et al. | |
| 2020/0090417 A1 | 3/2020 | Schloter | |

OTHER PUBLICATIONS

Indirect Time of Flight cameras; Perenzoni; 2011; (Year: 2011).*
Introduction to Time-of-Flight Camera; Larry li; 2014; (Year: 2014).*
A Time-Of-Flight Depth Sensor-System Description; Gokturk; et al.—2004. (Year: 2004).*
Time of flight optical ranging sensor based on current photonic demodulator; 2006; (Year: 2006).*
Indirect Time of Flight cameras; Perenzoni; et al.—2011; (Year: 2011).*
Introduction to Time-of-Flight Camera; Larry; 2014; (Year: 2014).*
Li, Larry, "Time-of-Flight Camera—An Introduction," Technical White Paper, No. SLOA190B—Jan. 2014 (rev. May 2014), Copyright 2014, Texas Instruments, Inc., 10 pages.
Moller, Tobias et al., "Robust 3D Measurement with PMD Sensors," Proceedings of the 1st Range Imaging Research Day at ETH, Zurich, Switzerland (2005), 14 pages.
Wikipedia, "Bracketing," URL: https://en.wikipedia.org/wiki/Bracketing (printed Jun. 27, 2018), 3 pages.
Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.
Cristian Pop, "Introduction to the BodyCom Technology", Microchip AN1391, May 2, 2011, pp. 1-24, vol. AN1391, No. DS01391A, Publisher: 2011 Microchip Technology Inc.
Drown, Dan, "PPS over USB," Jul. 12, 2017, URL: http://blog.dan.drown.org/pps-over-usb/, downloaded on Jun. 20, 2018, 12 pages.

* cited by examiner

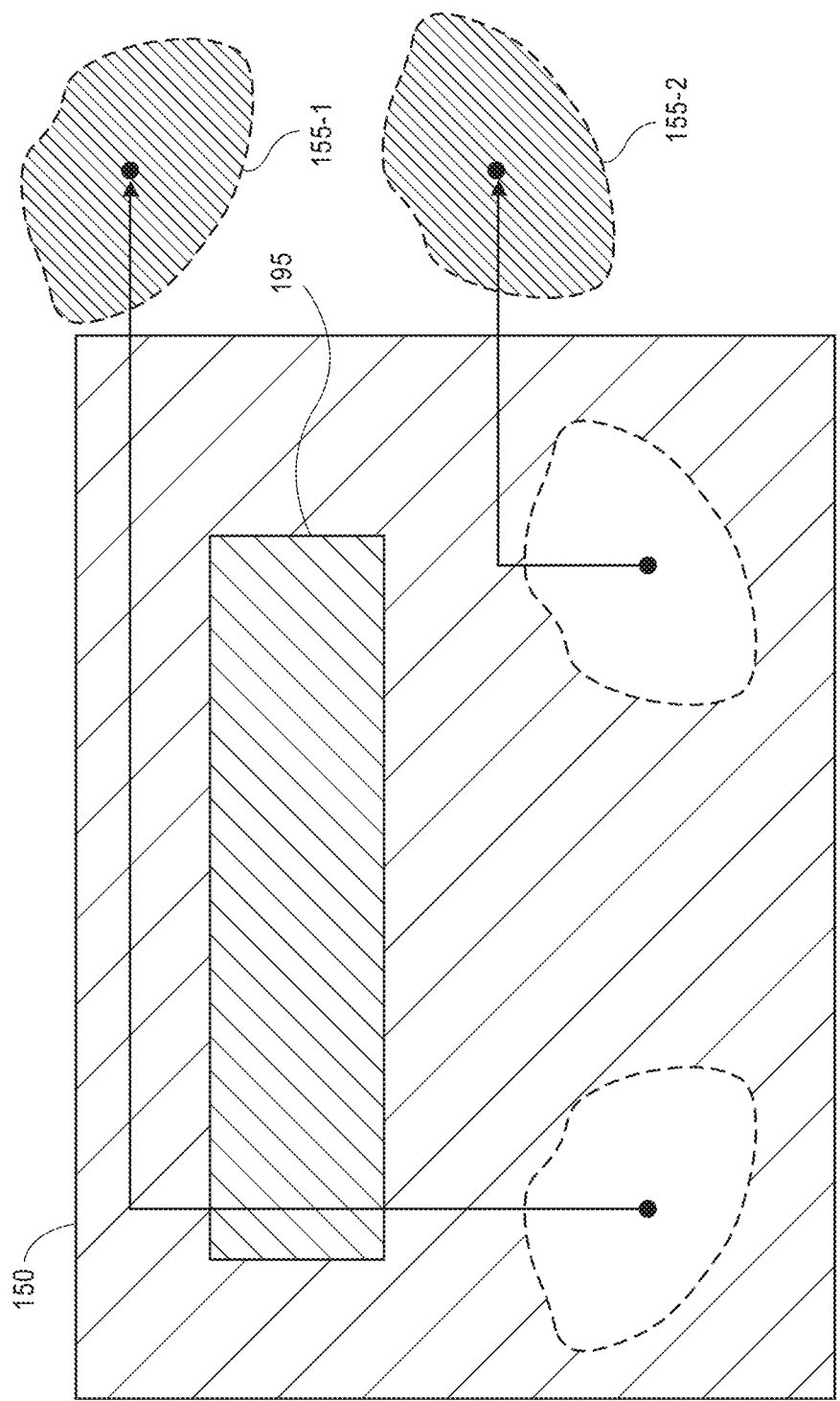

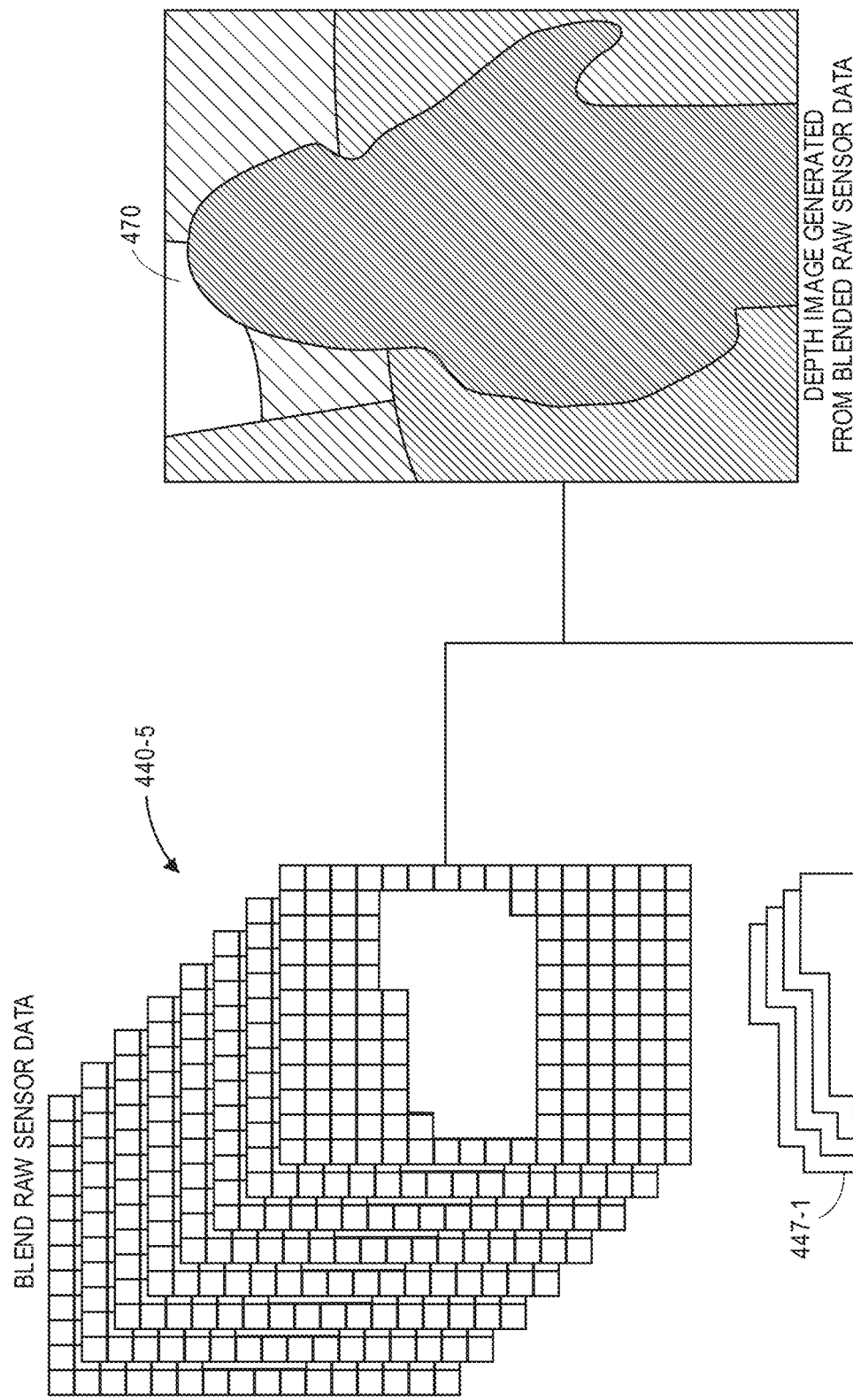

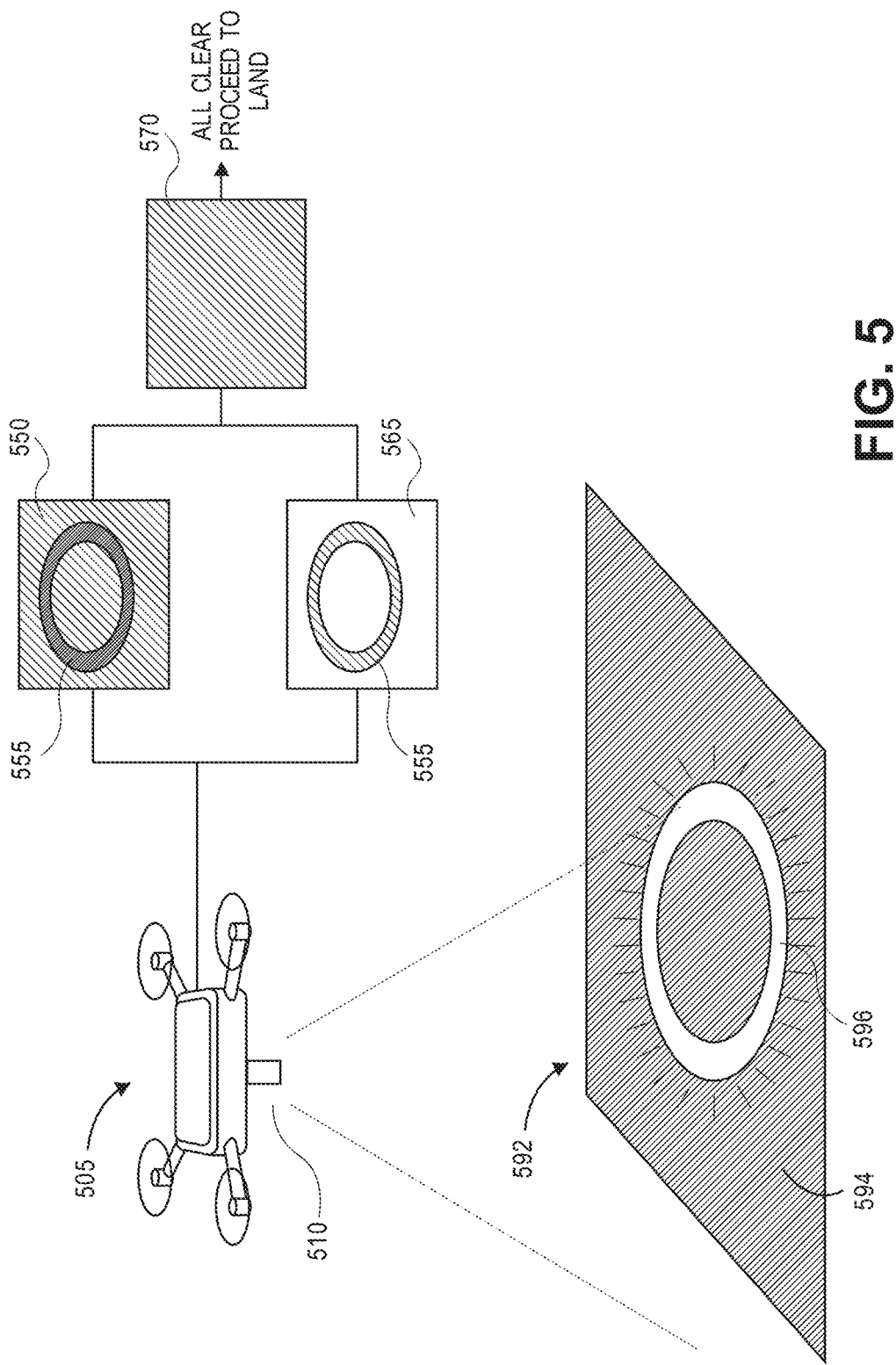

US 10,999,524 B1

TEMPORAL HIGH DYNAMIC RANGE IMAGING USING TIME-OF-FLIGHT CAMERAS

CROSS-REFERENCE TO RELATED APPLICATIONS

This application claims priority to U.S. Patent Application No. 62/656,889, filed Apr. 12, 2018, the contents of which are incorporated by reference herein in their entirety.

BACKGROUND

A "time-of-flight" camera is a depth-sensing or range-sensing system that operates by illuminating a scene using a light source (e.g., a modulated light source) and capturing light that is reflected from various points of the scene following the illumination. Time-of-flight cameras are typically equipped with an illuminator for illuminating a scene, and a sensor for capturing reflected light from the scene. The reflected light that is captured by a time-of-flight camera sensor may be interpreted to generate a depth image or profile of portions of the scene within a field of view of the time-of-flight camera. Some time-of-flight cameras may capture and interpret reflected light, and generate depth images or profiles of portions of scenes from such reflected light, several dozen times per second. Depth images or profiles generated by time-of-flight cameras can be very accurate.

A retroreflector is an object or surface that reflects light with minimal scattering, typically with rays having vectors that are parallel to and opposite in direction from a source of the light. Retroreflective materials are commonly used in applications where enhanced visibility is desired, such as by applying retroreflective materials to surfaces of objects of importance in areas or environments having varying weather or lighting conditions, e.g., safety cones, street signs, highway barriers, or road stripes. Retroreflective materials may also be worn by workers who operate in such areas. For example, protective or working clothing such as jackets, vests, pants, shirts, hats, gloves or the like may be formed from fabrics having one or more strips, bands, layers, panels or other sectors of retroreflective material. Alternatively, some such clothing may be formed from retroreflective material in their entirety.

In some applications, the effectiveness of a time-of-flight camera may be diminished where one or more retroreflective materials are present within a field of view of the time-of-flight camera. In particular, retroreflectivity may cause pixel sensors of a time-of-flight camera to be saturated, which distorts or corrupts a set of depth data generated by the time-of-flight camera, and results in one or more distortions or corruptions within a depth image generated from the set of depth data. For example, where a small number of pixel sensors of a time-of-flight camera detect light reflected from retroreflective materials, and are saturated by the reflected light, a corresponding portion of a depth image generated from data captured by the time-of-flight camera lacks accurate depth signals in this portion within the depth image. Where a large number of pixel sensors detect light reflected from retroreflective materials, portions of the depth image corresponding to the retroreflective materials are visibly blank, and an additional buffer, or halo, appears around the retroreflective materials due to light scattering within optical sensors of the time-of-flight camera. Retroreflective materials may therefore disrupt the processes by which depth images are generated for a scene using time-of-flight cameras, and result in the generation of depth images having substantially limited value.

BRIEF DESCRIPTION OF THE DRAWINGS

FIGS. 1A through 1G are views of aspects of one system for temporal high dynamic range imaging using time-of-flight cameras in accordance with embodiments of the present disclosure.

FIGS. 4A through 4G are views of aspects of one system for temporal high dynamic range imaging using time-of-flight cameras in accordance with embodiments of the present disclosure.

FIG. 5 is a view of aspects of one system for temporal high dynamic range imaging using time-of-flight cameras in accordance with embodiments of the present disclosure.

DETAILED DESCRIPTION

As is set forth in greater detail below, the present disclosure is directed to temporal high dynamic range imaging using time-of-flight cameras. More specifically, the systems and methods disclosed herein are directed to capturing depth data from a scene (e.g., at a materials handling facility) using time-of-flight cameras, and determining whether one or more retroreflective objects or materials are present within fields of view of such cameras based on an extent to which photoreceptors or other pixel sensors of the time-of-flight cameras are saturated by reflections of light. Upon determining that one or more retroreflective objects or materials is present within a field of view of a time-of-flight camera, the time-of-flight camera begins to capture depth data by illuminating the field of view at lower light levels (e.g., at reduced energy or power levels), or by exposing the sensor for shorter durations to capture light reflected from the scene. Portions of depth data captured by the time-of-flight camera at standard illumination energies and for standard exposure durations that correspond to saturated pixel sensors may be identified and masked therefrom, e.g., according to a masking algorithm such as a dilation algorithm, or a maximum/minimum operator. Depth data corresponding to the saturated pixel sensors that is captured by the time-of-flight camera in response to the illumination at the lower light levels and following the exposure at shorter durations may be blended or otherwise combined to form a depth image, e.g., an image or map representing depths or ranges to objects on the scene from the time-of-flight camera, that is free from distortions or corruptions due to the retroreflectivity of any objects that are present within the field of view.

Figure 1A:
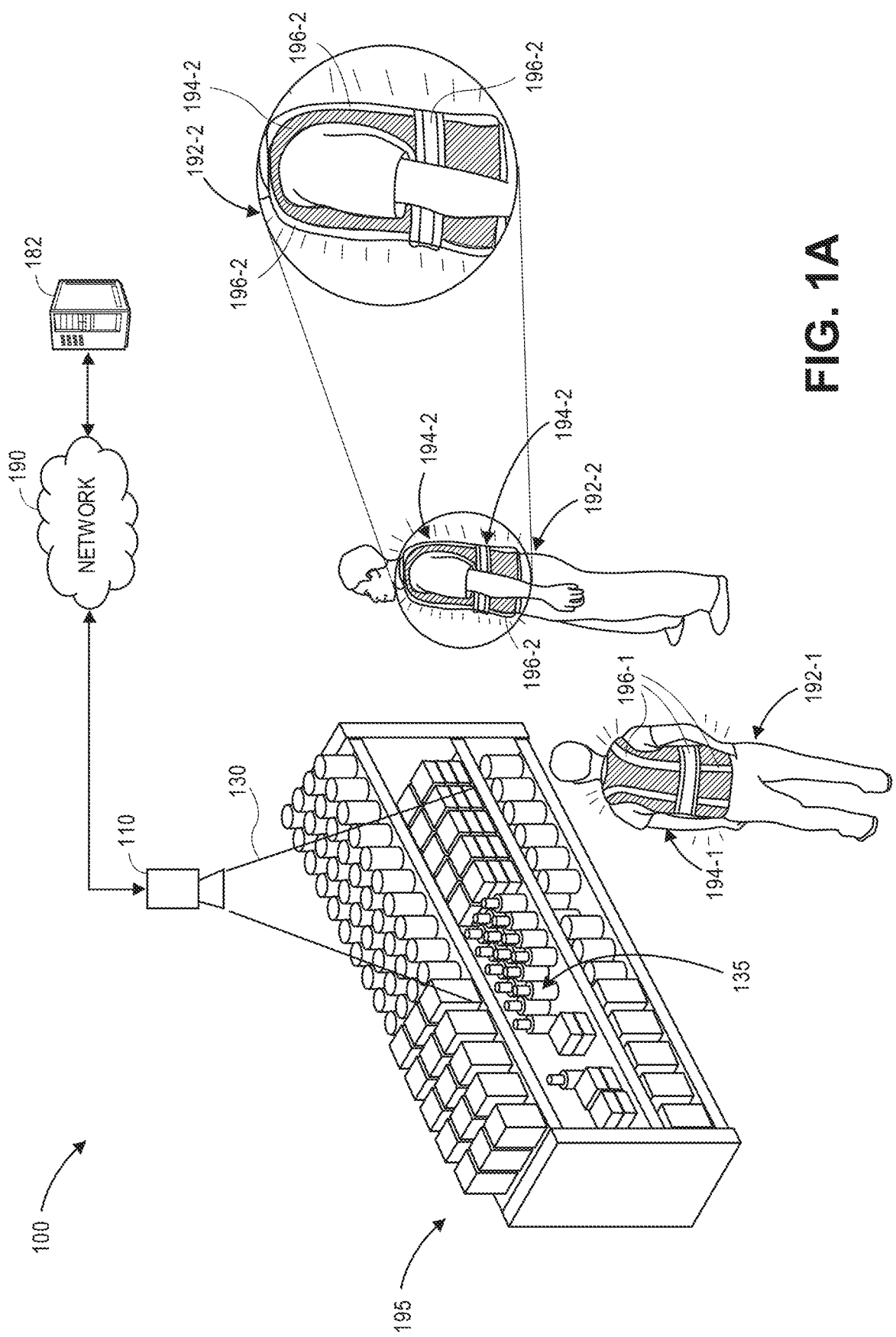
Figure 1B:
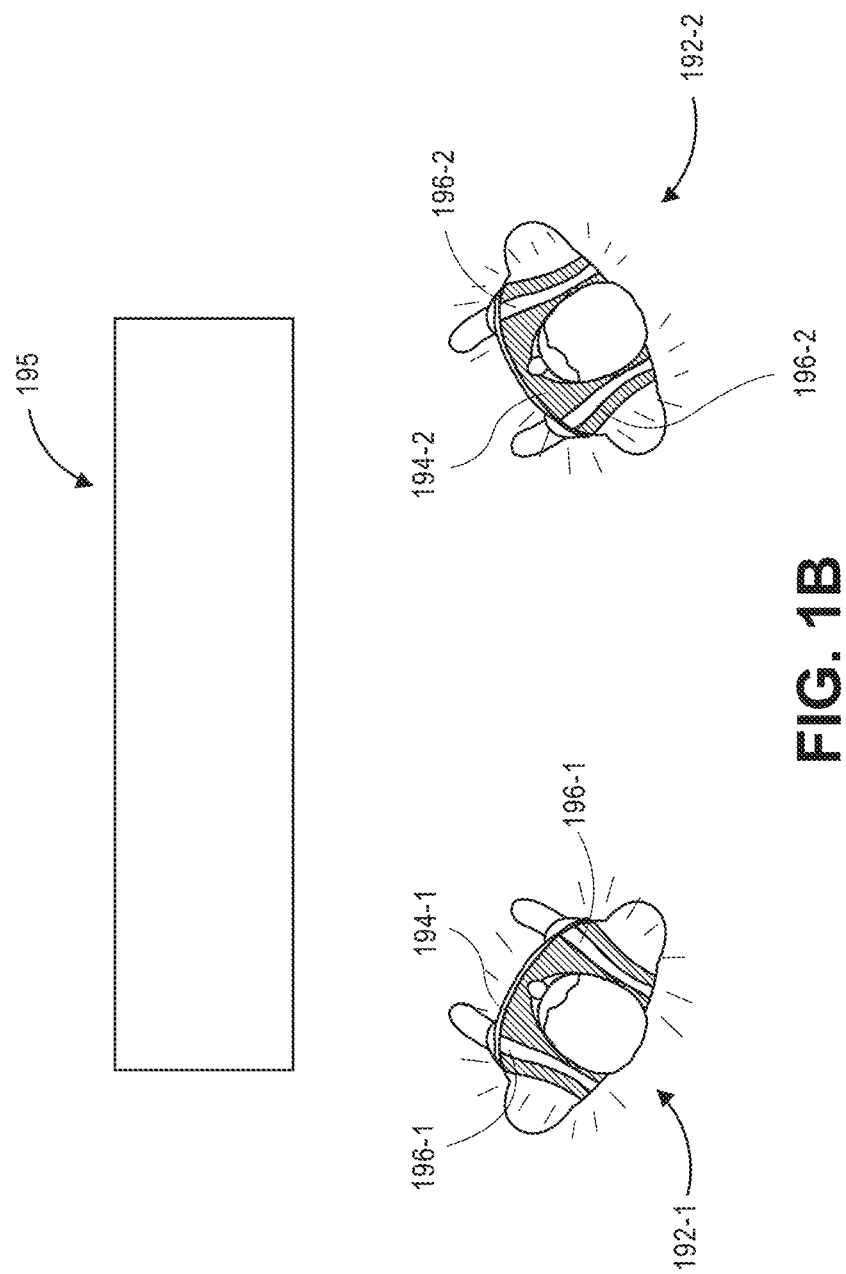

Referring to FIGS. 1A through 1G, views of aspects of one system 100 for temporal high dynamic range imaging using time-of-flight cameras in accordance with the present disclosure are shown. As is shown in FIGS. 1A and 1B, the system 100 includes a time-of-flight camera 110 and a server 182 that are connected to one another over a network 190, which may include the Internet in whole or in part. The time-of-flight camera 110 has a field of view 130 that includes at least a portion of a materials handling facility, e.g., an inventory storage unit 195 (e.g., at least one of a shelf, a table, a bin, a rack, a bar or a hook) with a plurality of items stored thereon. The time-of-flight camera 110 includes an illuminator for the field of view with modulated light pulses, and sensors for capturing and interpreting light reflected from the inventory storage unit 195 or the items thereon and/or a pair of actors 192-1, 192-2. In some embodiments, the sensor of the time-of-flight camera 110 may include a plurality of photoreceptors or other pixel sensors, and such photoreceptors or pixel sensors may be arranged in an array, a grid or any other shape or arrangement. The actors 192-1, 192-2 are each wearing retroreflective vests (or other retroreflective clothing) 194-1, 194-2 having one or more strips, bands, sections or other portions of retroreflective material 196-1, 196-2.

Figure 1C:
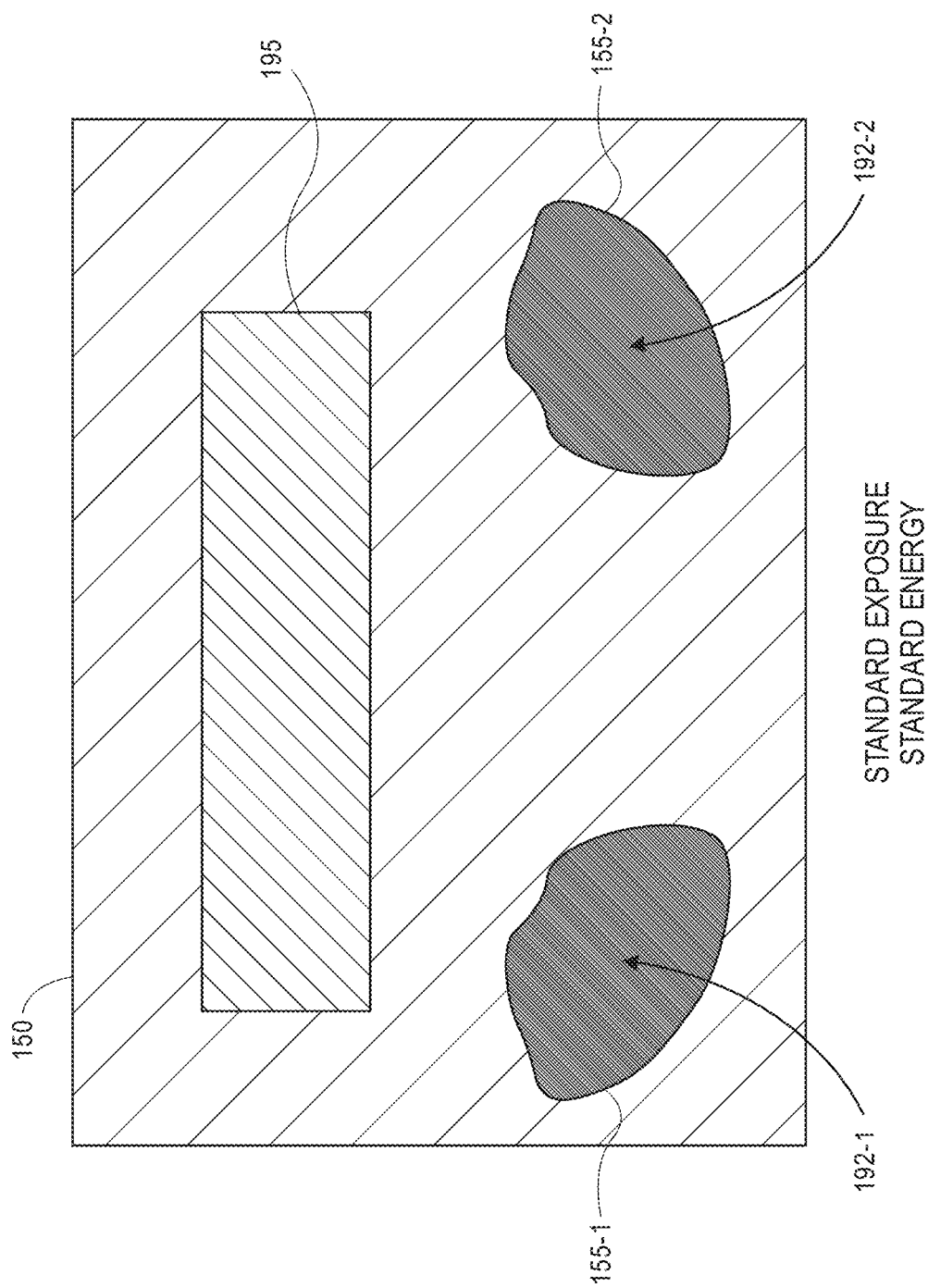

As is discussed above, where retroreflective materials are present within fields of view of time-of-flight cameras, pixel sensors that detect light reflected from such materials are often saturated, and the effects of the saturation may impact pixels corresponding to the retroreflective materials and also neighboring or surrounding pixels within raw sensor data or depth images generated therefrom. As is shown in FIG. 1C, a depth image 150 generated from raw sensor data captured by the time-of-flight camera 110 with illumination at standard energies or powers, and with a sensor exposed for standard durations. The depth image 150, which is an image or map representing depths or ranges to objects from the sensor of the time-of-flight camera 110, is generated based on the capture of light reflected from the scene as a result of the illumination at the standard energies or powers, shows corrupted regions 155-1, 155-2 corresponding to the actors 192-1, 192-2 who are wearing the retroreflective vests 194-1, 194-2 as shown in FIGS. 1A and 1B. The reflection of light from the retroreflective materials 196-1, 196-2 and the resulting saturation of pixel sensors causes the regions 155-1, 155-2 to have distortions or corruptions that encompass substantial portions of the depth image 150 which are larger than the corresponding sizes of the retroreflective vests 194-1, 194-2 within a plane of the depth image 150. Alternatively, the reflection of light from the retroreflective materials 196-1, 196-2 and the resulting saturation of pixel sensors may result in distortions or corruptions that occupy any portion of the depth image 150.

The extent to which pixel sensors of the imaging device 110 are saturated may depend on any factors. In some embodiments, a size of a corrupted region, and a number of saturated pixel sensors, may depend on a visible contrast between a retroreflective material and neighboring portions of the scene, e.g., between the retroreflective vests 194-1, 194-2 and the retroreflective materials 196-1, 196-2, or a relative difference in signals generated by the corresponding pixel sensors. For example, where a retroreflective material is applied against a bright background, e.g., a yellow or orange background, a relative difference in signals generated by the pixel sensors at or near an interface between the retroreflective material and the background may be comparatively low, and a corrupted region associated with the retroreflective materials will likewise be substantially small. Where a retroreflective material is applied against a dark background, however, e.g., a black or a brown background, a relative difference in signals generated by the pixel sensors at or near an interface between the retroreflective material and the background may be comparatively high, and a corrupted region associated with the retroreflective materials may be substantially large.

The corrupted regions 155-1, 155-2 may be identified within the depth image 150, or within the raw sensor data from which the depth image 150 was generated, on any basis. For example, where a clipping value (e.g., distortion limit), e.g., 0 or 4095 for a twelve-bit pixel sensor, is reached for a predetermined threshold number of pixel sensors (e.g., for ten, one hundred, one thousand, or another number of the pixel sensors) for a given set of raw sensor data, the raw sensor data may be determined to be distorted or corrupted at locations corresponding to the saturated pixel sensors, and the time-of-flight camera may be presumed to have one or more retroreflective materials within the field of view. Where the depth image 150 is generated from a predetermined number of sets of raw sensor data (e.g., eight) captured at various frequencies or phase differences between the illumination pulsing and the pixel exposure, the time-of-flight camera may be presumed to have one or more retroreflective materials within the field of view when a threshold number of the sets of raw sensor data (e.g., six or seven) are identified as having the predetermined threshold number of pixel sensors at or above the clipping value.

Figure 1D:
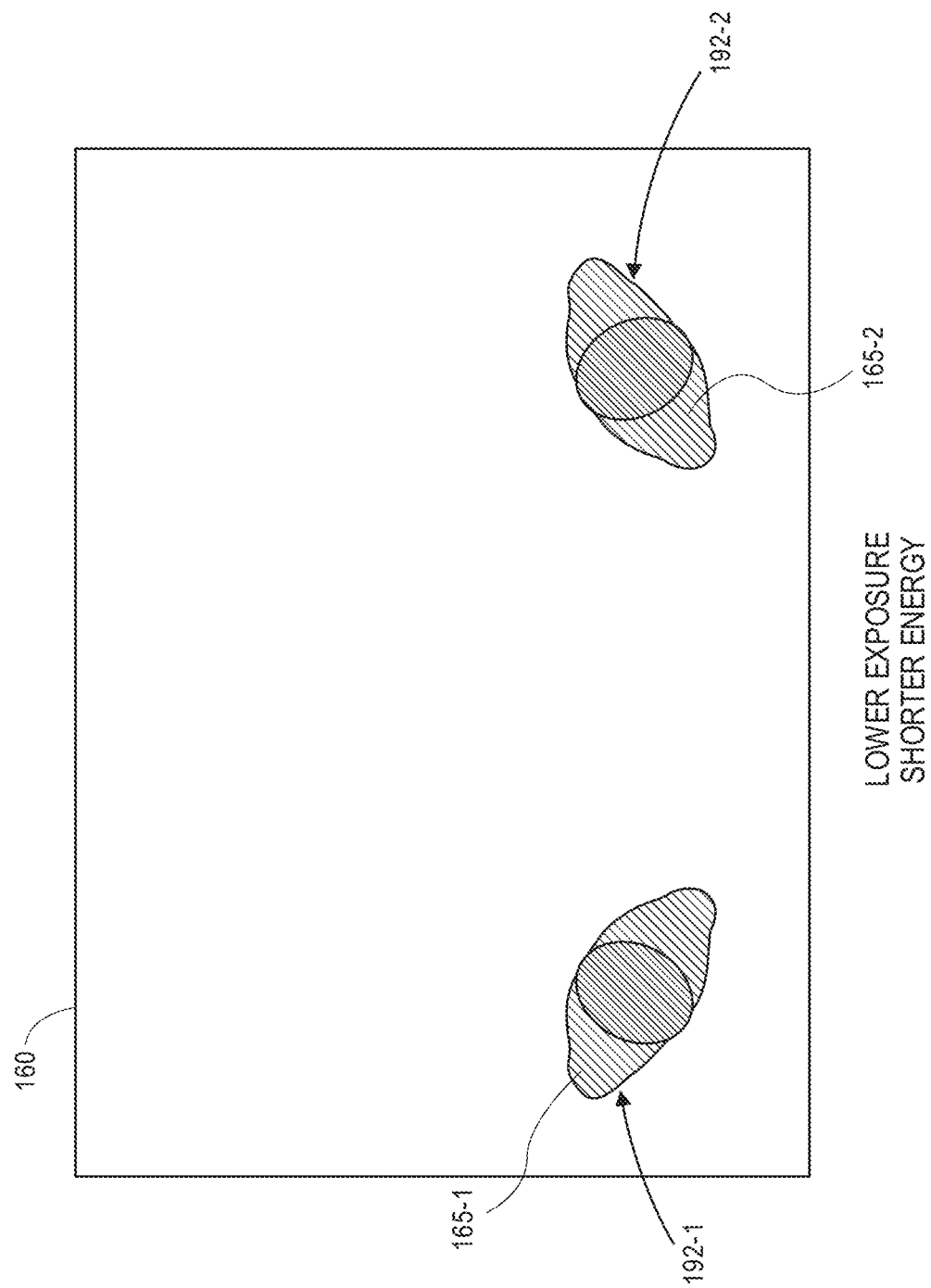

In accordance with the present disclosure, adverse effects of the saturation of the pixel sensors of the time-of-flight camera 110 may be overcome by capturing one or more additional sets of raw sensor data using illuminations at lower light levels, e.g., at lower energies or powers, and by exposing the sensors for shorter durations. As is shown in FIG. 1D, a depth image 160 generated from raw sensor data captured by the time-of-flight camera 110 with illumination at lower energies or powers, and by exposing the sensor for shorter durations, is shown. The depth image 160, which is generated based on the capture of light reflected from the scene as a result of the illumination at the lower energies or powers, and by exposing the sensor for the shorter durations, clearly depicts ranges to the actors 192-1, 192-2, despite the fact that the actors 192-1, 192-2 are wearing retroreflective vests 194-1, 194-2. Due to the reduced illumination energies or powers and exposure times, the depth image 160 generally depicts only portions of the scene having the retroreflective materials therein, e.g., the actors 192-1, 192-2 and their retroreflective vests 194-1, 194-2, which reflect substantially greater portions of the illuminated light to the imaging device 110 than portions of the scene that do not demonstrate properties of retroreflectivity.

Figure 1F:
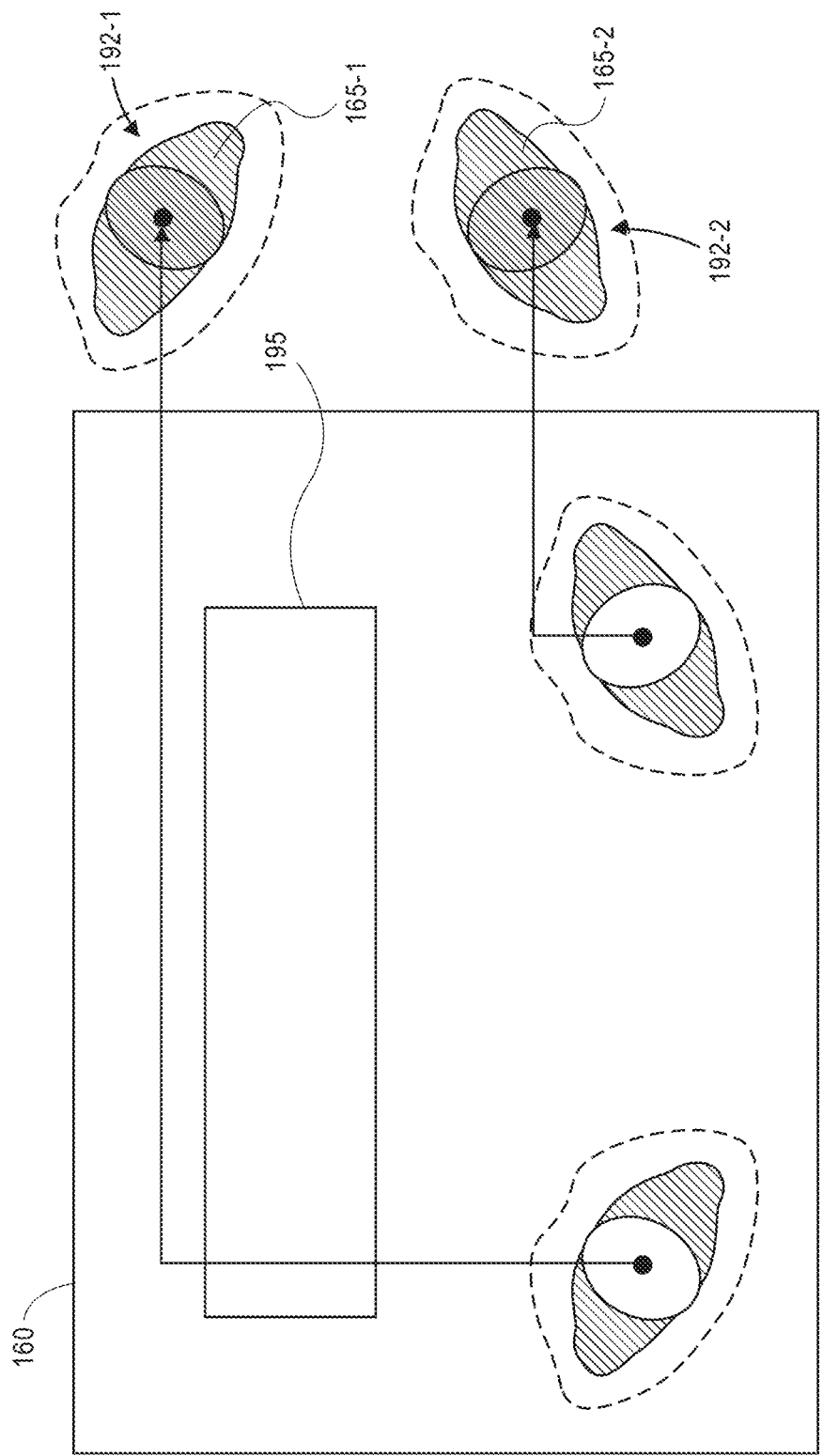

As is discussed above, a depth image may be generated using a time-of-flight camera, despite the presence of retroreflective material within a field of view of the time-of-flight camera, by illuminating a scene with standard energies or powers and exposing the sensor for standard durations, capturing a first set of raw sensor data and, upon determining that sufficient portions of the first set of raw sensor data are distorted or corrupted, capturing a second set of raw sensor data by illuminating the scene with reduced energies or powers or exposing the sensor for reduced durations. The first set of raw sensor data (or depth images generated therefrom) may be blended (or combined) with the second set of raw sensor data (or depth images generated therefrom) to account for the saturation of the pixel sensors, and to form a depth image that does not depict such corruptions. As is shown in FIG. 1E, the corrupted regions 155-1, 155-2 may be extracted from the depth image 150. As is shown in FIG. 1F, uncorrupted portions 165-1, 165-2 of the depth image 160 corresponding to the corrupted regions 155-1, 155-2 extracted from the depth image 150 may be extracted from the depth image 160.

Figure 1G:
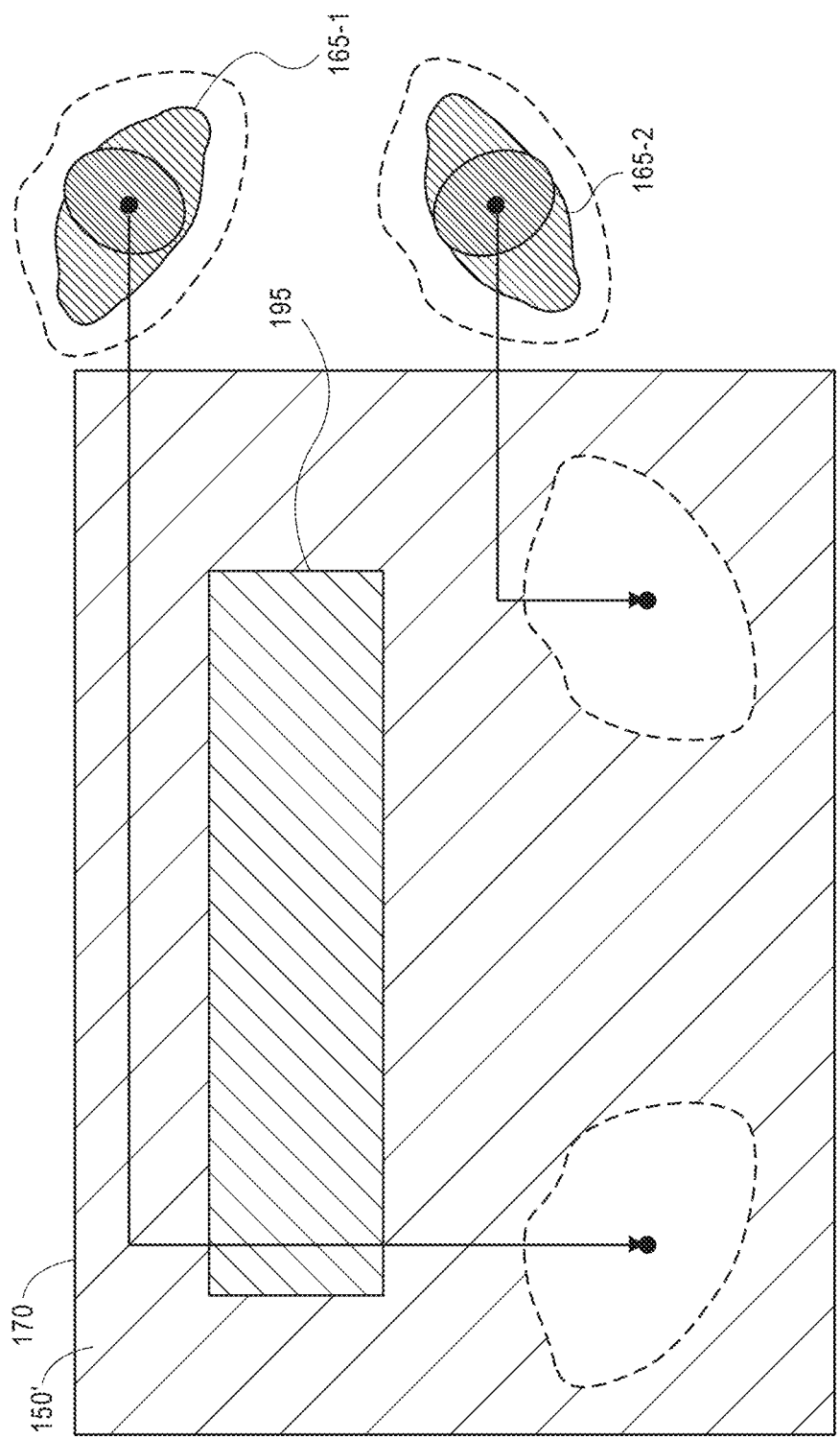

As is shown in FIG. 1G, a composite depth image 170 may be formed based on a balance of the depth image 150, e.g., a portion of the depth image 150 remaining following the extraction of the corrupted regions 155-1, 155-2, and the corresponding uncorrupted portions 165-1, 165-2 of the depth image 160. The uncorrupted portions 165-1, 165-2 of the depth image 160 may be blended into (or combined with) the balance of the depth image 150. In some embodiments, the imaging device 110 may be configured to capture raw sensor data in an alternating fashion, e.g., at standard illumination energies or powers and at standard exposure times, and at reduced illumination energies or powers and at reduced exposure times. Depth images may be generated based on consecutively captured sets of sensor data, until depth imaging operations are no longer required or desired.

Accordingly, the systems and methods of the present disclosure may be used to generate depth images using time-of-flight cameras, even where one or more retroreflective materials or objects are present within fields of view of the time-of-flight cameras. Retroreflective material may be detected within raw sensor data obtained by a time-of-flight camera that illuminates a scene using light at standard energies or power levels, and captures light that is reflected from the scene for standard exposure durations, where a predetermined number of photoreceptors or other pixel sensors are exceedingly saturated (e.g., supersaturated) by the reflected light. Upon determining that a threshold number of distorted or corrupted pixels are present within the raw sensor data, the time-of-flight camera may transition from a temporal low dynamic range imaging mode to a temporal high dynamic range imaging mode, in which the time-of-flight camera begins to capture raw sensor data by illuminating the scene at lower light levels, e.g., using light at reduced energies or power levels, or by capturing reflected light for reduced exposure durations. The distorted or corrupted pixels may be masked from the raw sensor data captured at the standard illumination energies and for the standard exposure durations, and corresponding pixels of the raw sensor data captured at the reduced illumination energies or for the reduced exposure durations may be identified. A depth image that is free from distortions or corruptions may be generated from the blended raw sensor data, and utilized for any purpose.

A time-of-flight camera is an imaging device having an illuminator and a sensor that determines distances to each of a plurality of pixels corresponding to a portion of a scene within a field of view by illuminating the scene by the illuminator, e.g., a modulated light source, and capturing the reflected light by the sensor. The illuminator typically emits light (e.g., infrared or near-infrared light having a wavelength between eight hundred and nine hundred nanometers, or 800-900 nm) by way of a laser, a light-emitting diode (or "LED"), or other light source. The sensor may be an array of photodetectors, photosensitive components or other pixel sensors such as a charge coupled device ("CCD"), a complementary metal-oxide sensor ("CMOS"), photodiodes, or the like. The sensor may capture light reflected from objects on the scene and assigns one or more quantitative values (e.g., distances or ranges to such objects) to aspects of the reflected light. In some embodiments, the time-of-flight camera may be a discrete, standalone unit. In some other embodiments, the time-of-flight camera may be integrally or functionally joined with a visual camera, e.g., a color camera, a grayscale camera or a black-and-white camera.

In some embodiments, a time-of-flight camera operates by illuminating a scene and determining a time required for light to travel from the illuminator to an individual photodetector of the sensor. A distance from the time-of-flight camera to each of the respective portions of a scene corresponding to one of the photodetectors may be determined as a function of the speed of light, or approximately 300 million meters per second (or $3.0 \times 10^8$ m/s). Because a time-of-flight camera may illuminate an entire field of view simultaneously, a time-of-flight camera may be used to generate depth images or profiles of the field of view quickly and efficiently from each illumination.

A time-of-flight camera may operate to illuminate a scene, or to capture light reflected from the scene, in any number of ways. For example, in some embodiments, an illuminator of a time-of-flight camera may operate using one or more pulsed light sources. Pulsed modulation may be achieved by integrating photoelectrons from reflected light, or by counting light contact at a first detection of a reflection, e.g., by a single photon avalanche diode, or another type of sensor having any number of photoreceptors (or other pixel sensors) thereon. Electrical charges may be accumulated and measured by each of the photoreceptors, for each of the pulses, during windows that are in-phase and/or out-of-phase with the illumination. The measured electrical charges may be used to calculate distances to portions of the scene appearing within the field of view that correspond to such photoreceptors accordingly. Where the electrical charge accumulated by a photoreceptor exceeds a predetermined threshold, the photoreceptor is determined to be saturated, and a corresponding pixel (e.g., a voxel) of a depth image generated based on the electrical charge will be distorted or corrupted. A number of the photoreceptors that are determined to be saturated to a predetermined extent may be counted based on the imaging data, e.g., a number of pixels of the depth image that are distorted or corrupted. Where the number exceeds a predetermined threshold, the time-of-flight camera may transition from a low dynamic range imaging mode to a high dynamic range imaging mode, and begin to capture sensor data at standard illumination energies and standard exposure times, and at reduced illumination energies and reduced exposure times, in an alternating fashion.

In some embodiments, an illuminator of a time-of-flight camera may operate using a continuous wave light source which captures a number of samples at different phases with respect to the illumination. For example, a continuous wave time-of-flight camera may capture four samples, e.g., at four phases, each phase-stepped by ninety degrees (viz., zero, ninety, one hundred eighty or two hundred seventy degrees). In some embodiments, a phase-shift of a signal, a signal strength and/or an offset (or a gray-scale value) may be calculated for each of the photoreceptors of a sensor, or pixels of a depth image, as a function of the electrical charge accumulated in each of the samples. A distance associated with each of the photoreceptors of the sensor, or pixels of the depth image (e.g., voxels) may be calculated as a function of the speed of light, the phase-shift and a modulation frequency, which may be selected based on the distances or ranges to be measured, a desired level of accuracy, or any other basis.

In some embodiments, raw values associated with each of the photoreceptors of a sensor of the time-of-flight camera may be determined, and whether such photoreceptors are saturated may be determined by comparing values of pixels (e.g., voxels) of a depth image generated thereby to a selected threshold. For example, in some embodiments, where photoreceptors of a time-of-flight camera are twelve-bit sensors, a given photoreceptor may be determined to be saturated where a raw value exceeds 3500, or another threshold, between clipping values of 0 to 4095, for any of the phases at which the time-of-flight camera captures samples. In some embodiments, the photoreceptor may be determined to be supersaturated where the raw value exceeds a higher threshold, e.g., 4000, or equals a clipping value (e.g., 0 or 4095), for each of the phases. A number of the photoreceptors that are determined to be saturated to a predetermined extent may be counted. Where the number exceeds a predetermined threshold, the time-of-flight camera may transition from a low dynamic range imaging mode to a high dynamic range imaging mode, and begin to capture sensor data at standard illumination energies and standard exposure times, and at reduced illumination energies and reduced exposure times, in an alternating fashion. Values may be expressed in an absolute sense, e.g., within a range of 0 to 4095 for a twelve-bit sensor, or as ratios or fractions of clipping values, e.g., within a range of 0 to 1.

The continuous waves may be illuminated at different modulation frequencies, thereby increasing a level of accuracy of depth images captured by the time-of-flight camera, or distances embodied in such depth images, accordingly. In some embodiments, a continuous wave time-of-flight camera may operate at a pair of modulation frequencies, and may capture four sets of sensor data at each of the modulation frequencies, for a total of eight sets of sensor data. Each of the sets of sensor data may be evaluated to determine a number of the photoreceptors that is saturated to a predetermined extent. Where the number exceeds a predetermined threshold, the time-of-flight camera may transition from a low dynamic range imaging mode to a high dynamic range imaging mode, and begin to capture sensor data at standard illumination energies and standard exposure times, and at reduced illumination energies and reduced exposure times, in an alternating fashion.

Reflected light may be captured or detected by a time-of-flight camera if the reflected light is within the time-of-flight camera's field of view, which is defined as a function of a distance between a sensor and a lens within the time-of-flight camera, viz., a focal length, as well as a location of the time-of-flight camera and an angular orientation of the time-of-flight camera's lens. Accordingly, where an object appears within a depth of field, or a distance within the field of view where the clarity and focus is sufficiently sharp, a time-of-flight camera may capture light that is reflected off objects of any kind to a sufficiently high degree of resolution using one or more sensors thereof, and store information regarding the reflected light in one or more data files.

Many time-of-flight cameras also include manual or automatic features for modifying their respective fields of view or orientations. For example, a time-of-flight camera may be configured in a fixed position, or with a fixed focal length (e.g., fixed-focus lenses) or angular orientation. Alternatively, a time-of-flight camera may include one or more actuated or motorized features for adjusting a position of the time-of-flight camera, or for adjusting either the focal length (e.g., zooming the imaging device) or the angular orientation (e.g., the roll angle, the pitch angle or the yaw angle) of the time-of-flight camera, by causing a change in a distance between the sensor and the lens (e.g., optical zoom lenses or digital zoom lenses), a change in a location of the time-of-flight camera, or a change in one or more of the angles defining an angular orientation.

For example, a time-of-flight camera may be hard-mounted to a support or mounting that maintains the time-of-flight camera in a fixed configuration or angle with respect to one, two or three axes. Alternatively, however, a time-of-flight camera may be provided with one or more motors and/or controllers for manually or automatically operating one or more of the components, or for reorienting the axis or direction of the time-of-flight camera, i.e., by panning or tilting the time-of-flight camera. Panning a time-of-flight camera may cause a rotation within a horizontal plane or about a vertical axis (e.g., a yaw), while tilting a time-of-flight camera may cause a rotation within a vertical plane or about a horizontal axis (e.g., a pitch). Additionally, a time-of-flight camera may be rolled, or rotated about its axis of rotation, and within a plane that is perpendicular to the axis of rotation and substantially parallel to a field of view of the time-of-flight camera.

High dynamic ranging, or HDR, is an imaging technique by which an imaging device captures imaging data at a variety of exposure levels and merges (e.g., blends) the imaging data together to form a single image. A sensor of an imaging device may be exposed at various exposure levels or exposure values, which are sometimes called "stops," on a given scale. When frames of imaging data are captured according to a high dynamic ranging technique, the respective frames of imaging data may be bracketed, or combined, into a single image frame.

The systems and methods of the present disclosure may be utilized in any number of applications in which depth imaging operations are desired, including but not limited to applications associated with operations occurring within a materials handling facility. As used herein, the term "materials handling facility" may include, but is not limited to, warehouses, distribution centers, cross-docking facilities, order fulfillment facilities, packaging facilities, shipping facilities, rental facilities, libraries, retail stores or establishments, wholesale stores, museums, or other facilities or combinations of facilities for performing one or more functions of material or inventory handling for any purpose. For example, in some implementations, one or more of the systems and methods disclosed herein may be used to detect and distinguish between actors (e.g., customers) and recognize their respective interactions within a materials handling facility, where one or more actors is wearing retroreflective materials within the materials handling facility using a time-of-flight camera, or where one or more retroreflective objects are expected to appear within a field of view of a time-of-flight camera at the materials handling facility. Such systems and methods may also be utilized to identify and track actors and their interactions within transportation centers, financial institutions or like structures in which diverse collections of people, objects or machines enter and exit from such environments at regular or irregular times or on predictable or unpredictable schedules, and where one or more of the people, objects or machines is wearing or covered at least in part by retroreflective materials, or where external surfaces of one or more of the people, the objects or the machines embodies retroreflective properties.

Retroflective materials may cause photoreceptors of a time-of-flight camera sensor corresponding to such materials, and photoreceptors corresponding to nearby portions, to be saturated when sensor data is captured at standard illumination energies and for standard exposure times. Sensor data determined from photoreceptors of the time-of-flight camera sensor that are not saturated, however, may remain unaffected, and may therefore be used to construct one or more depth images therefrom. Conversely, sensor data may be accurately captured from photoreceptors corresponding to the retroreflective materials, and nearby photoreceptors, at reduced illumination energies or reduced exposure times, due to the enhanced reflective properties of the retroreflective materials. Sensor data captured from other photoreceptors at reduced illumination energies or reduced exposure times may be inaccurate or unusable, however.

Therefore, sensor data captured by such other photoreceptors at standard illumination energies and standard exposure times may be blended with sensor data captured by the photoreceptors corresponding to the retroreflective materials at reduced illumination energies or reduced exposure times to generate an accurate depth image of a scene, despite the presence of the retroreflective materials on the scene. Alternatively, a portion of a depth image generated from sensor data captured at standard illumination energies and standard exposure times that excludes distortions or corruptions corresponding to retroreflective materials may be blended with a portion of a depth image generated from sensor data captured at reduced illumination energies or reduced exposure times that corresponds to the retroreflective materials to generate an accurate depth image of a scene, despite the presence of the retroreflective materials on the scene.

A time-of-flight camera may be configured to illuminate a scene, and to expose a sensor, at any energies or power levels or for any exposure times, respectively, in accordance with the present disclosure. For example, in some embodiments, a standard energy level (or power level) at which a time-of-flight camera may illuminate a scene may be approximately five to ten watts (5-10 W), and a standard exposure time may be approximately five hundred to two thousand microseconds (500-2000 μs). In some embodiments, a reduced energy level (or power level) at which a time-of-flight camera may illuminate a scene may be approximately one sixty-fourth or one two hundred fifty-sixth ($\frac{1}{64}$-$\frac{1}{256}$) of the standard energy level (or power level). In some embodiments, a reduced exposure time may be as low as twenty to thirty microseconds (20-30 μs), or any number of stops below a standard exposure time.

In some embodiments, where a first set of sensor data is captured at a standard illumination energy (or power level) and for a standard exposure time, a second set of sensor data may be captured at a reduced illumination energy (or power level) and for a reduced exposure time. Alternatively, in some other embodiments, the second set of sensor data may be captured at either a reduced illumination energy (or power level) or for a reduced exposure time.

Figure 2:
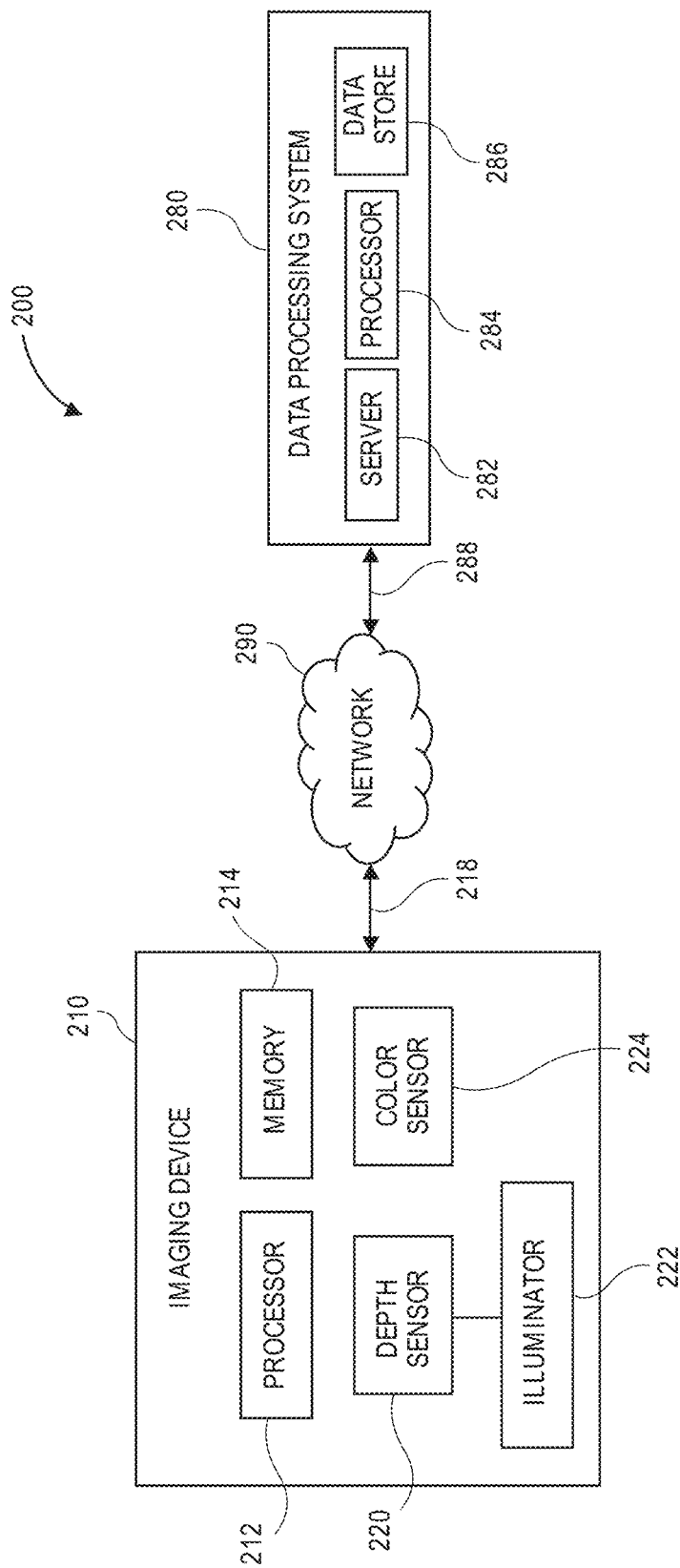
FIG. 2 is a block diagram of one system for temporal high dynamic range imaging using time-of-flight cameras in accordance with embodiments of the present disclosure.

Referring to FIG. 2, a block diagram of one system 200 for temporal high dynamic range imaging using time-of-flight cameras in accordance with embodiments of the present disclosure is shown. The system 200 of FIG. 2 includes an imaging device 210 and a data processing system 280 that are connected to one another over a network 290, which may include the Internet, in whole or in part. Except where otherwise noted, reference numerals preceded by the number "2" shown in FIG. 2 indicate components or features that are similar to components or features having reference numerals preceded by the number "1" shown in FIGS. 1A through 1G.

The imaging device 210 may be any form of optical recording devices that may be used to photograph or otherwise record imaging data of structures, facilities, terrain or any other elements appearing within their respective fields of view. The imaging device 210 may include one or more sensors, memory or storage components and processors, and such sensors, memory components or processors may further include one or more photosensitive surfaces, filters, chips, electrodes, clocks, boards, timers, power sources, connectors or any other relevant features (not shown). For example, as is shown in FIG. 2, the imaging device 210 may include one or more optical sensors, including a one or more depth sensors 220, one or more illuminators 222 and one or more RGB sensors 224 (or grayscale sensors or black-and-white sensors) 230 that are configured to capture visual imaging data (e.g., textures) or depth imaging data (e.g., ranges) to objects within one or more fields of view of the imaging device 210. The imaging device 210 may capture imaging data in the form of one or more still or moving images of any kind or form, as well as any relevant audio signals or other information. The imaging device 210 may also be adapted or otherwise configured to communicate with the data processing system 280 by way of the network 290.

The depth sensors 220 and the RGB sensors 224 may be any sensors having single elements or a plurality of photoreceptors or photosensitive components (e.g., a CCD sensor, a CMOS sensor, or another sensor), which may be typically arranged in an array. Light reflected from objects within a field of view of the imaging device 210 may be captured by the depth sensors 220 and the RGB sensors 224, and quantitative values, e.g., pixels, may be assigned to one or more aspects of the reflected light. The illuminators 222 may be any systems such as a laser system or a light-emitting diode (or "LED") for illuminating a portion of a scene appearing within a field of view of the imaging device 210, e.g., by infrared or near-infrared light, such as light with wavelengths ranging from approximately seven hundred to approximately one thousand nanometers (700-1000 nm).

The imaging device 210 further includes one or more processors 212 and one or more memory components 214, and any other components (not shown) that may be required in order to capture, analyze and/or store imaging data. For example, the imaging device 210 may capture one or more still or moving images (e.g., streams of visual and/or depth image frames), along with any relevant audio signals or other information (e.g., position data), and may also connect to or otherwise communicate with the data processing system 280, or any other computer devices over the network 290, through the sending and receiving of digital data. In some implementations, the imaging device 210 may be configured to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, either by way of the data processing system 280 or over the network 290 directly. The processors 212 may be configured to process imaging data captured by one or more of the depth sensors 220 or the RGB sensors 224. For example, in some implementations, the processors 212 may be configured to execute any type or form of machine learning algorithm or technique, e.g., an artificial neural network.

The imaging device 210 may be homogenous or heterogeneous in nature, in accordance with the present disclosure. For example, one or more of the imaging device 210 may have both the depth sensor 220 and the RGB sensor 224, such as an RGBz or RGBD camera. Alternatively, one or more of the imaging device 210 may have just a depth sensor 220 or just an RGB sensor 224 (or grayscale sensor or black-and-white sensor). For example, one or more of the imaging device 210 may be an RGB color camera, a still camera, a motion capture/video camera or any other type or form of camera. In other implementations, one or more of the imaging device 210 may be depth-sensing cameras, such as an RGBz or RGBD camera. In still other implementations, one or more of the imaging device 210 may be a thermographic or infrared (IR) camera. Additionally, in some implementations, the imaging device 210 may simply be camera modules that include a lens and an image sensor configured to convert an optical image obtained using the lens of the camera into a digital signal or digital representation of the image (generally referred to herein as imaging data).

The imaging device 210 may also include manual or automatic features for modifying their respective fields of view or orientations. For example, one or more of the imaging device 210 may be configured in a fixed position, or with a fixed focal length (e.g., fixed-focus lenses) or angular orientation. Alternatively, one or more of the imaging device 210 may include one or more motorized features for adjusting a position of the imaging device 210, or for adjusting either the focal length (e.g., zooming) of the imaging device 210 or the angular orientation (e.g., the roll angle, the pitch angle or the yaw angle) of the imaging device 210, by causing changes in the distance between the sensor and the lens (e.g., optical zoom lenses or digital zoom lenses), changes in the location of the imaging device 210, or changes in one or more of the angles defining the angular orientation.

For example, one or more of the imaging device 210 may be hard-mounted to a support or mounting that maintains the device in a fixed configuration or angle with respect to one, two or three axes. Alternatively, however, one or more of the imaging device 210 may be provided with one or more motors and/or controllers for manually or automatically operating one or more of the components, or for reorienting the axis or direction of the device, i.e., by panning or tilting the device. Panning an imaging device may cause a rotation within a horizontal axis or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Some of the imaging device 210 may digitally or electronically adjust an image identified in a field of view, subject to one or more physical and operational constraints. For example, a digital camera may virtually stretch or condense the pixels of an image in order to focus or broaden a field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Once the characteristics of stationary or moving objects or portions thereof have been recognized in one or more digital images, such characteristics of the objects or portions thereof may be matched against information regarding contours, outlines, colors, textures, silhouettes, shapes or other characteristics of known objects, which may be stored in one or more data stores. In this regard, stationary or moving objects may be classified based at least in part on the extent to which the characteristics identified in one or more digital images correspond to one or more of the characteristics of the known objects.

Although the system 200 of FIG. 2 includes a single box corresponding to the imaging device 210, those of ordinary skill in the pertinent arts will recognize that any number or type of imaging devices may be operated in accordance with the present disclosure, including but not limited to digital cameras, depth sensors or range cameras, infrared cameras, radiographic cameras or other devices having one or more optical sensors. In some implementations, the system 200 may include dozens or even hundreds of imaging devices of any type or form.

The data processing system 280 includes one or more physical computer servers 282 having one or more computer processors 284 and any number of data stores 286 (e.g., databases) associated therewith, as well as provided for any specific or general purpose. For example, the data processing system 280 of FIG. 2 may be independently provided for the exclusive purpose of receiving, analyzing or storing imaging data or other information or data received from the imaging device 210 or, alternatively, provided in connection with one or more physical or virtual services configured to receive, analyze or store such imaging data or other information or data, as well as one or more other functions. The servers 282 may be connected to or otherwise communicate with the processors 284 and the data stores 286, which may store any type of information or data, including but not limited to acoustic signals, information or data relating to imaging data, or information or data regarding environmental conditions, operational characteristics, or positions, for any purpose. The servers 282 and/or the computer processors 284 may also connect to or otherwise communicate with the network 290, as indicated by line 288, through the sending and receiving of digital data. For example, the data processing system 280 may include any facilities, stations or locations having the ability or capacity to receive and store information or data, such as media files, in one or more data stores, e.g., media files received from the imaging device 210, or from one or more other external computer systems (not shown) via the network 290. In some embodiments, the data processing system 280 may be provided in a physical location. In other such embodiments, the data processing system 280 may be provided in one or more alternate or virtual locations, e.g., in a "cloud"-based environment. In still other embodiments, the data processing system 280 may be provided onboard one or more vehicles, e.g., an unmanned aerial vehicle.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some embodiments, the network 290 may be a private or semi-private network, such as a corporate or university intranet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The imaging device 210 and/or the data processing system 280 may use any web-enabled or Internet applications or features, or any other client-server applications or features including E-mail or other messaging techniques, to connect to the network 290, or to communicate with one another, such as through short or multimedia messaging service (SMS or MMS) text messages. For example, the imaging device 210 may be adapted to transmit information or data in the form of synchronous or asynchronous messages to the data processing system 280 or to any other computer device in real time or in near-real time, or in one or more offline processes, via the network 290. Those of ordinary skill in the pertinent art would recognize that the imaging device 210 or the data processing system 280 may operate or be operated by any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the processors 212 or the processor 284, or any other computers or control systems utilized by the imaging device 210 or the data processing system 280, and having sequences of instructions which, when executed by a processor (e.g., a central processing unit, or "CPU"), cause the processor to perform all or a portion of the functions, services and/or methods described herein. Such computer executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
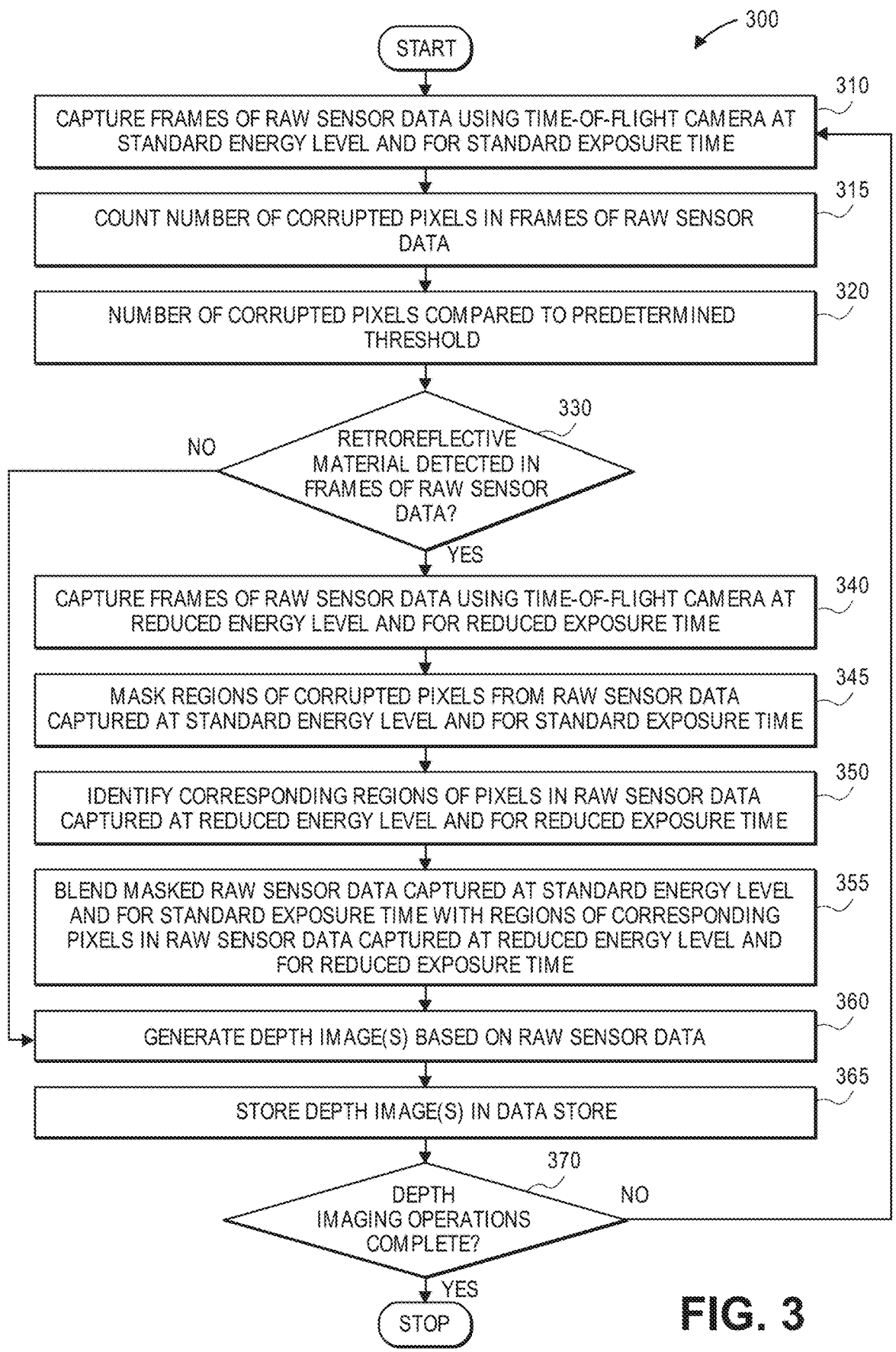
FIG. 3 is a flow chart of one process for temporal high dynamic range imaging using time-of-flight cameras in accordance with embodiments of the present disclosure.

Referring to FIG. 3, a flow chart 300 of one process for temporal high dynamic range imaging using time-of-flight cameras in accordance with embodiments of the present disclosure is shown. At box 310, frames of raw sensor data are captured using a time-of-flight camera at standard energy levels and for standard exposure times. For example, the standard energy levels may be approximately five to ten watts (5-10 W), and the standard exposure times may be five hundred to two thousand microseconds (500-2000 µs). Alternatively, the frames of raw sensor data may be captured at any energy levels and for any exposure times.

In some embodiments, the time-of-flight camera may project light that is modulated by pulsing, or modulated by a continuous wave source, e.g., a sinusoid or square wave, upon a scene using an illuminator, and may capture light reflected from portions of the scene that appear within a field of view of the time-of-flight camera. In some embodiments, where the illuminating light is pulsed, the modulation of the light may be achieved by integrating photoelectrons of the reflected light, or by counting the photoelectrons at the first detection of the reflected light. The scene is illuminated by the light source for a brief period, and reflected energy is sampled by each photoreceptor of a sensor, at every pixel, to determine a distance between the sensor and a portion of the scene corresponding to every pixel. In some embodiments, where the illuminating light is modulated by a continuous wave source, a plurality of samples may be captured at different phase angles between the illumination of the scene by the light source and the reflection of light from the scene. For example, in some embodiments, a total of four samplings may be captured, at ninety-degree phase intervals (viz., zero, ninety, one hundred eighty and two hundred seventy degrees), to determine a distance between the sensor and a portion of the scene corresponding to every pixel. Furthermore, in some embodiments, frames of raw sensor data may be captured at a single modulation frequency, or at two or more discrete modulation frequencies. Any number of frames of raw sensor data may be captured using a time-of-flight camera in accordance with embodiments of the present disclosure, and at any rate or modulation frequency, or by any technique for illumination and/or modulation.

At box 315, a number of corrupted pixels appearing within each of the frames of raw sensor data captured at box 310 is counted. As is discussed above, a photoreceptor (or other pixel sensor) associated with a pixel may be deemed to be supersaturated where a value for the pixel equals a clipping value for the photoreceptor, e.g., 0 or 4095 for a twelve-bit sensor. The number of corrupted pixels may be counted within a single frame of raw sensor data, or in two or more frames of raw sensor data, and may correspond to a subset of the photoreceptors of the sensor that is supersaturated by the reflected light. At box 320, the number of corrupted pixels determined at box 315 is compared to a predetermined threshold. The threshold may be selected on any basis, including a desired level of resolution for depth imaging data generated therefrom, a level of tolerance for distortions or corruptions within the depth imaging data, one or more properties of the time-of-flight camera or attributes of the scene, or on any other basis. Moreover, the threshold may relate to a single frame of the raw sensor data, e.g., a number of the corrupted pixels that are detected within one frame of the raw sensor data, or multiple frames of the raw sensor data, e.g., a number of corrupted pixels within an entire set of raw sensor data, including an aggregate number of corrupted pixels within all of the frames, an average number of corrupted pixels within each of the frames, or any other number. Alternatively, a number of pixels having any extent of distortion or corruption, e.g., photoreceptors or other pixel sensors that are saturated but not supersaturated, may be determined at box 315 and compared to a predetermined threshold at box 320 in accordance with the present disclosure.

At box 330, whether any retroreflective material is detected within the frames of the raw sensor data is determined, e.g., based on the number of observed corrupted pixels or supersaturated pixel sensors as compared to the predetermined threshold. If retroreflective material is not detected, then the process advances to box 360, where one or more depth images are generated based on the raw sensor data, and to box 365, where the depth images are stored in a data store.

If retroreflective material is detected within the raw sensor data, however, then the process advances to box 340, where frames of raw sensor data are captured using the time-of-flight camera at reduced energy levels and for reduced exposure times. For example, in some embodiments, a reduced energy level may be approximately one sixty-fourth or one two hundred fifty-sixth ($1/64$-$1/256$) of the standard energy level at which the imaging data was captured at box 310, while a reduced exposure time may be approximately twenty to thirty microseconds (20-30 µs), or any number of stops below the standard exposure time. At box 345, regions of the corrupted pixels are masked from the raw sensor data that was captured at the standard energy level and for the standard exposure times at box 310. The masking algorithm may be any detection algorithm configured to identify pixels that are corrupted or pixel sensors that are saturated to any extent (e.g., supersaturated). For example, one or more algorithms for identifying areas of noise, or areas without noise, within a given image frame (e.g., a masking algorithm such as a dilation algorithm or a maximum/minimum operator) may be used to recognize portions of the raw sensor data that are corrupted or photoreceptors of the sensor that are supersaturated, and therefore depict or correspond to retroreflective materials, as compared to portions of the raw sensor data that are not corrupted or pixel sensors that are not supersaturated based on their respective pixel values. Alternatively, a depth image may be generated from the raw sensor data, and the regions of corrupted pixels may be identified within the depth image and masked therefrom.

At box 350, regions within the raw sensor data that was captured at box 340 at the reduced energy levels and for the reduced exposure times that correspond to the masked regions of the corrupted pixels within the raw sensor data that was captured at the standard energy levels and for the standard exposure times are identified. For example, where masked regions of saturated photoreceptors or other pixel sensors are identified with respect to a Cartesian coordinate plane, e.g., with x-coordinates and y-coordinates, the corresponding regions of the raw sensor data that was captured by the time-of-flight camera at the reduced exposure levels and for the reduced exposure times may be identified using the same coordinates.

At box 355, the masked raw sensor data captured at the standard energy levels and for the standard exposure times is blended with the regions of the corresponding pixels within the raw sensor data captured at the reduced energy levels and for the reduced exposure times. As is discussed above, at box 360, one or more depth images are generated based on the raw sensor data, and at box 365, the depth images are stored in a data store.

After the depth images have been generated based on raw sensor data, either after retroreflective material has not been detected within the frames of the raw sensor data captured at the standard energy levels and for the standard exposure times, or after the masked raw sensor data captured at the standard energy levels and for the standard exposure times has been blended with the regions of the corresponding pixels within the raw sensor data captured at the reduced energy levels and for the reduced exposure times, the process advances to box 370, where whether the depth imaging operations are complete is determined. If the depth imaging operations are not complete, then the process returns to box 310, where frames of raw sensor data are captured using the time-of-flight camera at the standard energy levels and for the standard exposure times. If the depth imaging operations are complete, however, then the process ends.

As is discussed above, upon sensing that raw sensor data captured by a time-of-flight camera includes at least a predetermined number of pixels that are corrupted to a predetermined extent, e.g., a subset of the pixels, thereby implying that retroreflective material is present within a field of view of the time-of-flight camera, or that a depth image generated from the captured raw sensor data depicts retroreflective material therein, a time-of-flight camera in accordance with systems and methods of the present disclosure may begin to capture raw sensor data at lower levels of illumination and for lower exposure times. The raw sensor data may be captured in an alternating fashion, e.g., with standard and reduced illumination energies, and for standard and reduced exposure times, until the retroreflective material is no longer determined to be within the field of view of the time-of-flight camera.

Referring to FIGS. 4A through 4G, views of aspects of one system for temporal high dynamic range imaging using time-of-flight cameras in accordance with embodiments of the present disclosure are shown. Except where otherwise noted, reference numerals preceded by the number "4" shown in FIGS. 4A through 4G indicate components or features that are similar to components or features having reference numerals preceded by the number "2" shown in FIG. 2 or by the number "1" shown in FIGS. 1A through 1G.

Figure 4A:
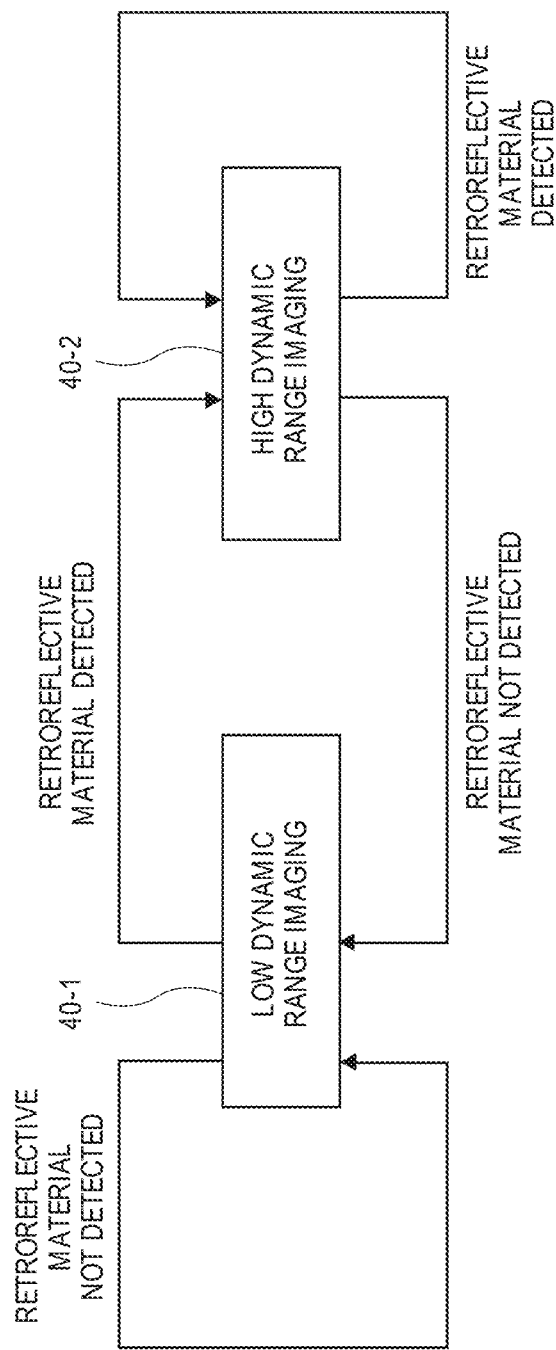

As is shown in FIG. 4A, a time-of-flight camera 410 may be programmed to conduct low dynamic range imaging and high dynamic range imaging operations, depending on the presence or absence of retroreflective material within a field of view of the time-of-flight camera 410. For example, as is shown in FIG. 4A, where retroreflective materials are not present within the field of view of the time-of-flight camera 410, the time-of-flight camera 410 may continue to operate in a low dynamic range imaging mode 40-1, and may generate depth images from raw sensor data captured thereby, at standard illumination energies and standard exposure times. Where the time-of-flight camera 410 senses retroreflective materials within its field of view, e.g., based on a non-negligent number of corrupted pixels therein, or where the number of corrupted pixels therein exceeds a predetermined threshold, the time-of-flight camera 410 may transition to a high dynamic range imaging mode 40-2 in which the time-of-flight camera 410 captures imaging data at standard illumination energies and reduced illumination energies, and for standard exposure times and reduced exposure times, in an alternating fashion.

Figure 4B:
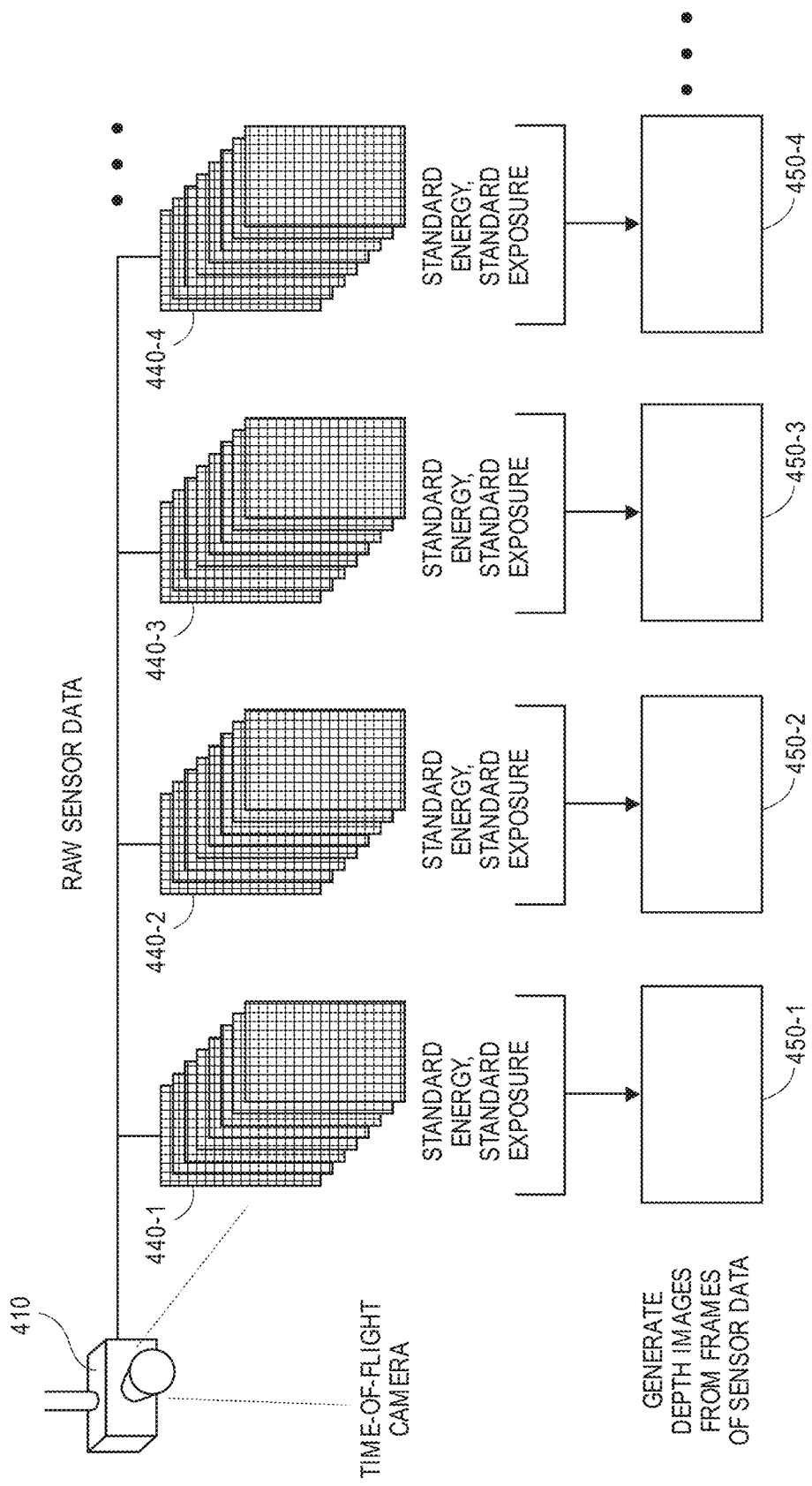

As is shown in FIG. 4B, the time-of-flight camera 410 may capture a plurality of sets of raw sensor data 440-1, 440-2, 440-3, 440-4 in series. The sets of raw sensor data 440-1, 440-2, 440-3, 440-4 may consist of single frames of raw sensor data captured in series, or multiple frames of raw sensor data. During the collection of the raw sensor data, the time-of-flight camera 410 may illuminate a scene by pulsed light, or by a continuous wave light source. The time-of-flight camera 410 may collect light that is illuminated at one or more modulation frequencies and/or at different phase intervals. The modulation frequencies and/or phase intervals may be selected on any basis, including but not limited to anticipated distances to aspects of a scene, or desired levels of accuracy or resolution. Depth images 450-1, 450-2, 450-3, 450-4 may be generated based on the raw sensor data 440-1, 440-2, 440-3, 440-4.

In some embodiments, where the illuminating light is modulated by a continuous wave source, a plurality of samples may be captured at different phase angles between the illumination of the scene by the light source and the reflection of light from the scene. For example, in some embodiments, a total of four samplings may be captured, at ninety-degree phase intervals (viz., zero, ninety, one hundred eighty and two hundred seventy degrees), to determine a distance between the sensor and a portion of the scene corresponding to every pixel. Furthermore, in some embodiments, frames of raw sensor data may be captured at a single modulation frequency, or at two or more discrete modulation frequencies. Any number of frames of raw sensor data may be captured using a time-of-flight camera in accordance with embodiments of the present disclosure, and at any rate or modulation frequency, or by any technique for illumination and/or modulation.

Figure 4C:
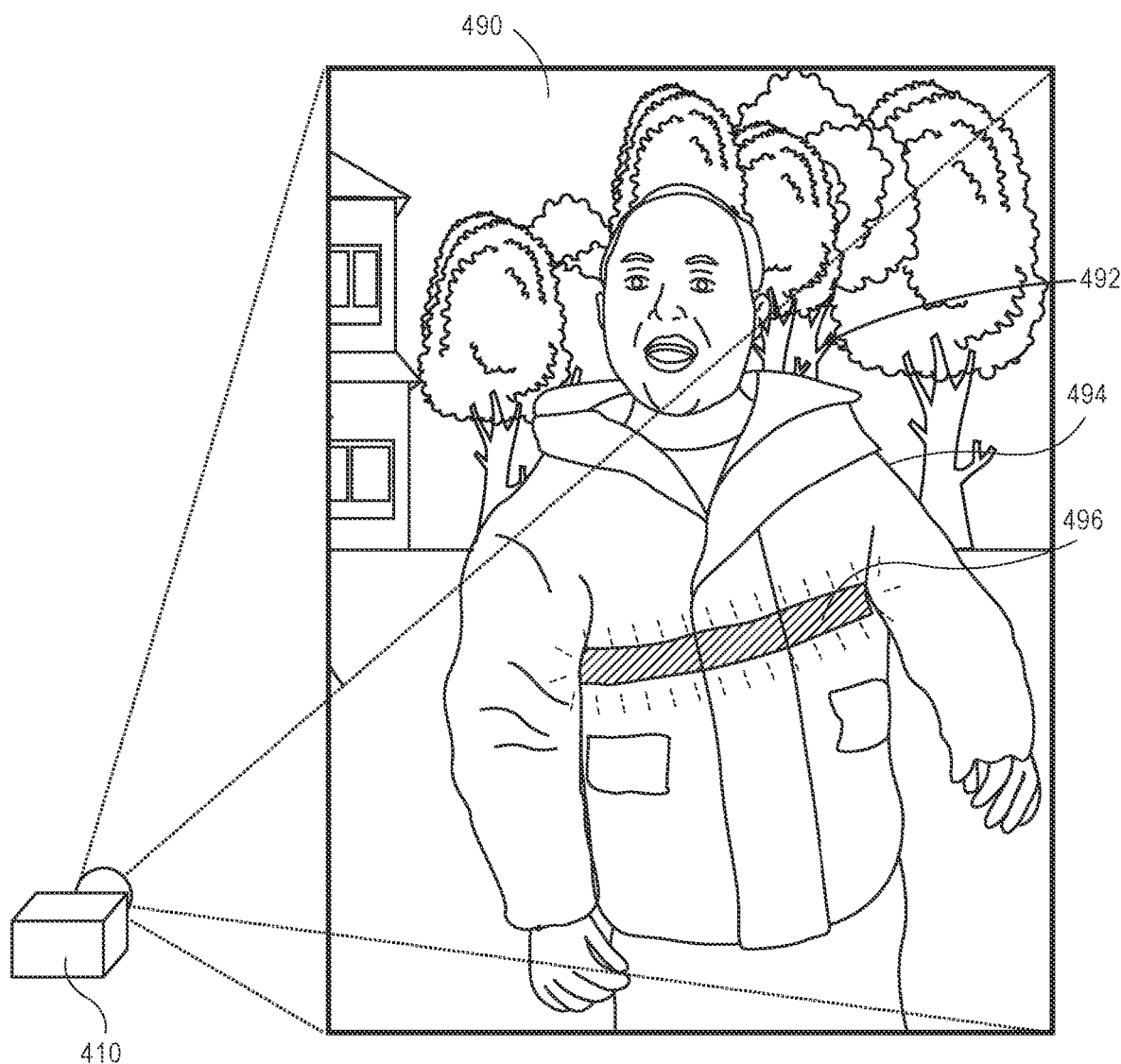
Figure 4D:
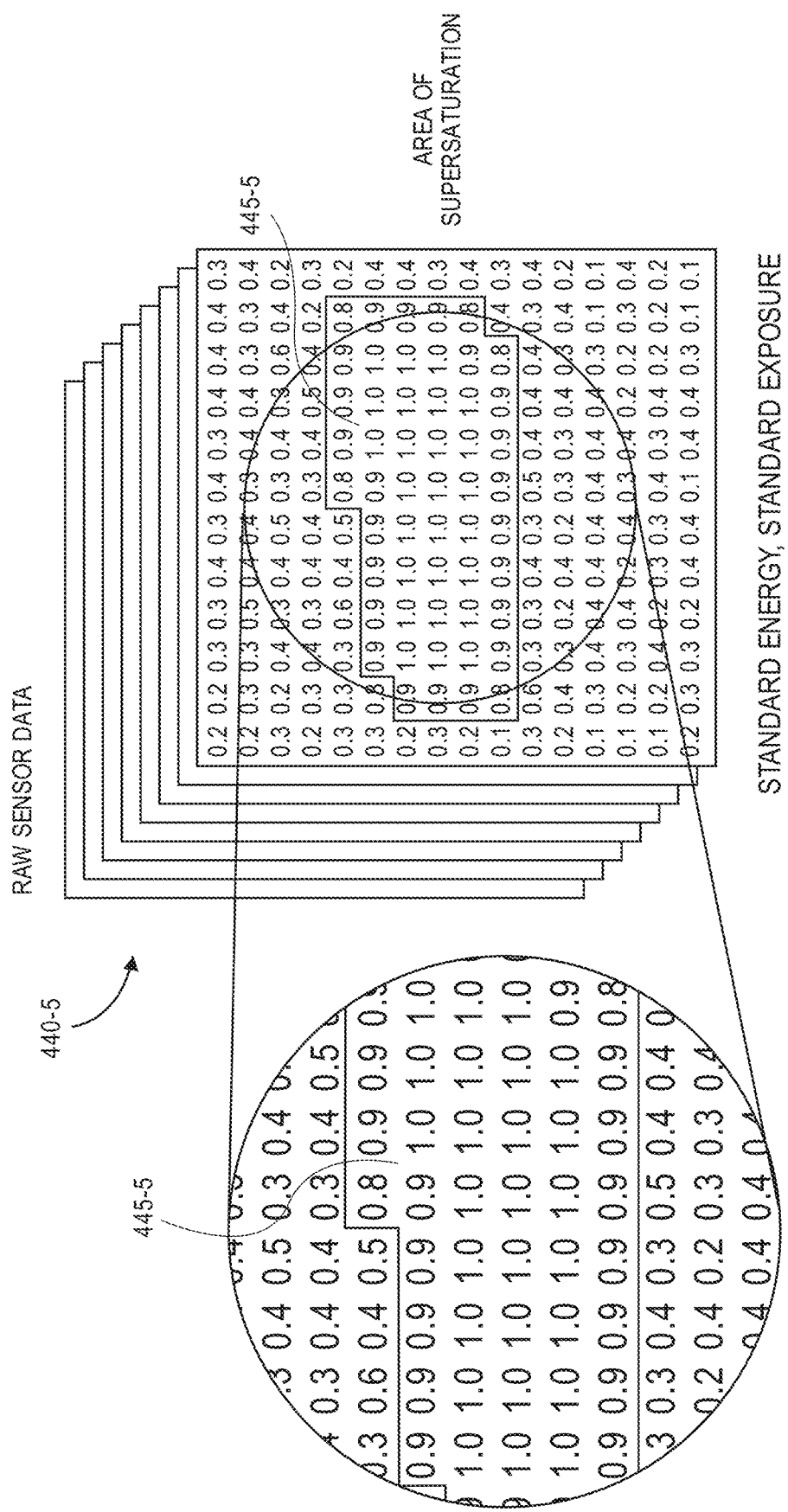

As is shown in FIG. 4C, where a retroreflective object 492 (viz., an actor having an article of clothing 494 with a retroreflective strip 496 or other component thereon) is present on a scene 490 within a field of view of the time-of-flight camera 410, the retroreflectivity of the strip 496 may be detected within a set of raw sensor data 440-5 based on a number of corrupted pixels therein, e.g., a subset of the photoreceptors of the sensor that are saturated or supersaturated, as determined from the values of the raw sensor data. For example, as is shown in FIG. 4D, where the set of raw sensor data 440-5 includes a plurality of sensor values, a region 445-5 of the raw sensor data 440-5 having values at or above a predetermined threshold, e.g., clipping values of the photoreceptors of the time-of-flight camera 410 or fractions or ratios of clipping values, may be determined to correspond to retroreflective materials within the field of view of the time-of-flight camera 410.

Figure 4E:
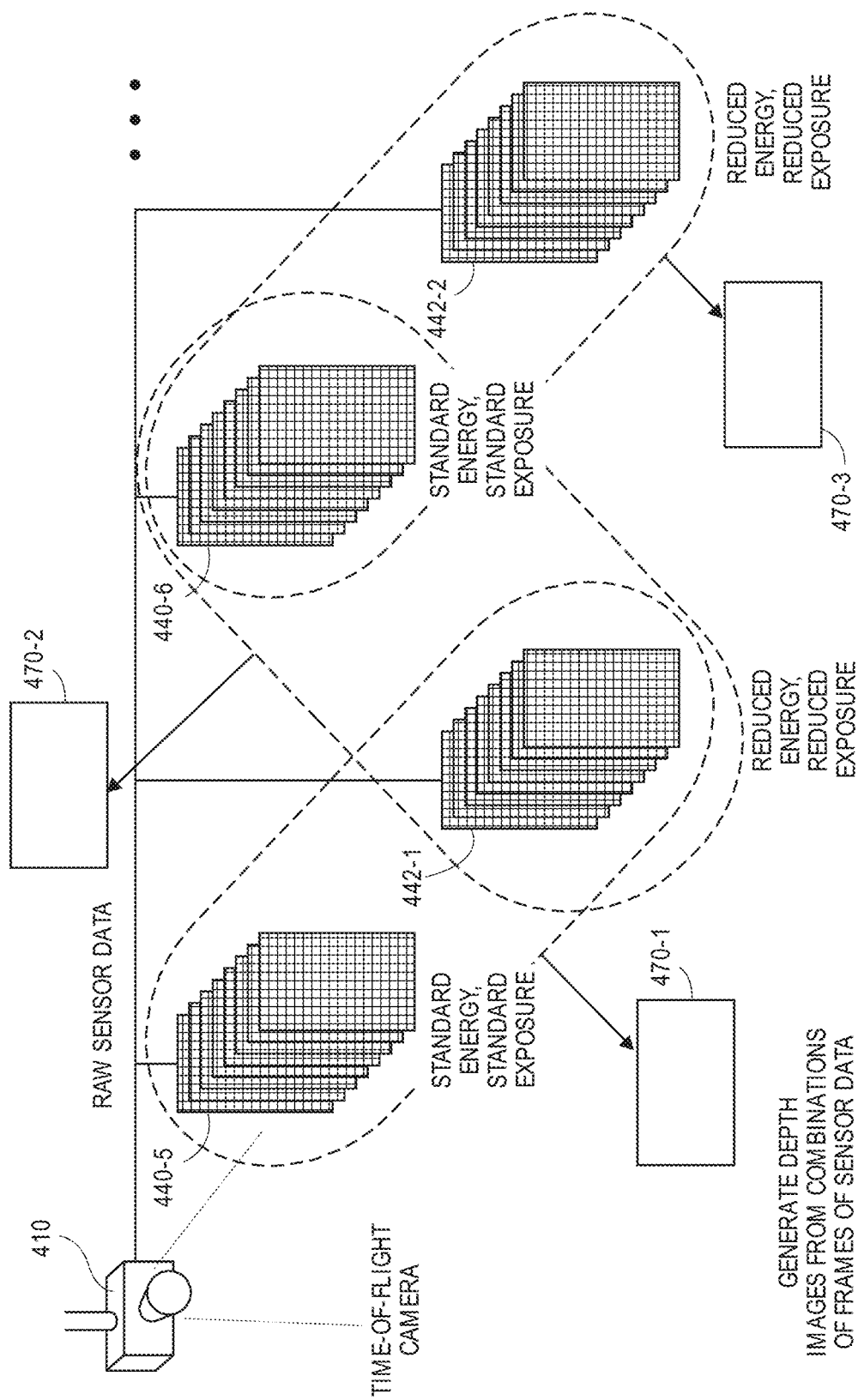

Accordingly, the time-of-flight camera 410 may transition from the low dynamic range imaging mode 40-1 to the high dynamic range imaging mode 40-2, and to begin capturing, in an alternating fashion, raw sensor data at standard energy levels and for standard exposure durations, and raw sensor data at reduced energy levels and for reduced exposure durations. As is shown in FIG. 4E, the time-of-flight camera 410 may capture a set of raw sensor data 442-1 at reduced energy levels and for reduced exposure durations after capturing the set of raw sensor data 440-5 at standard energy levels and for standard exposure durations, and may capture another set of raw sensor data 440-6 at standard energy levels and for standard exposure durations, before capturing another set of raw sensor data 442-2 at reduced energy levels and for reduced exposure durations. The time-of-flight camera 410 may capture the sets of raw sensor data 440-5, 442-1, 440-6, 442-2 as single frames, or as collections of multiple frames, and at any modulation frequencies. Depth images may be generated by blending consecutive sets of sensor data. For example, a depth image 470-1 may be generated by blending the raw sensor data 440-5 with the raw sensor data 442-1, while a depth image 470-2 may be generated by blending the raw sensor data 442-1 with the raw sensor 440-6, and a depth image 470-3 may be generated by blending the raw sensor data 440-6 with the raw sensor data 442-2, and so on and so forth, in an alternating fashion.

Figure 4F:
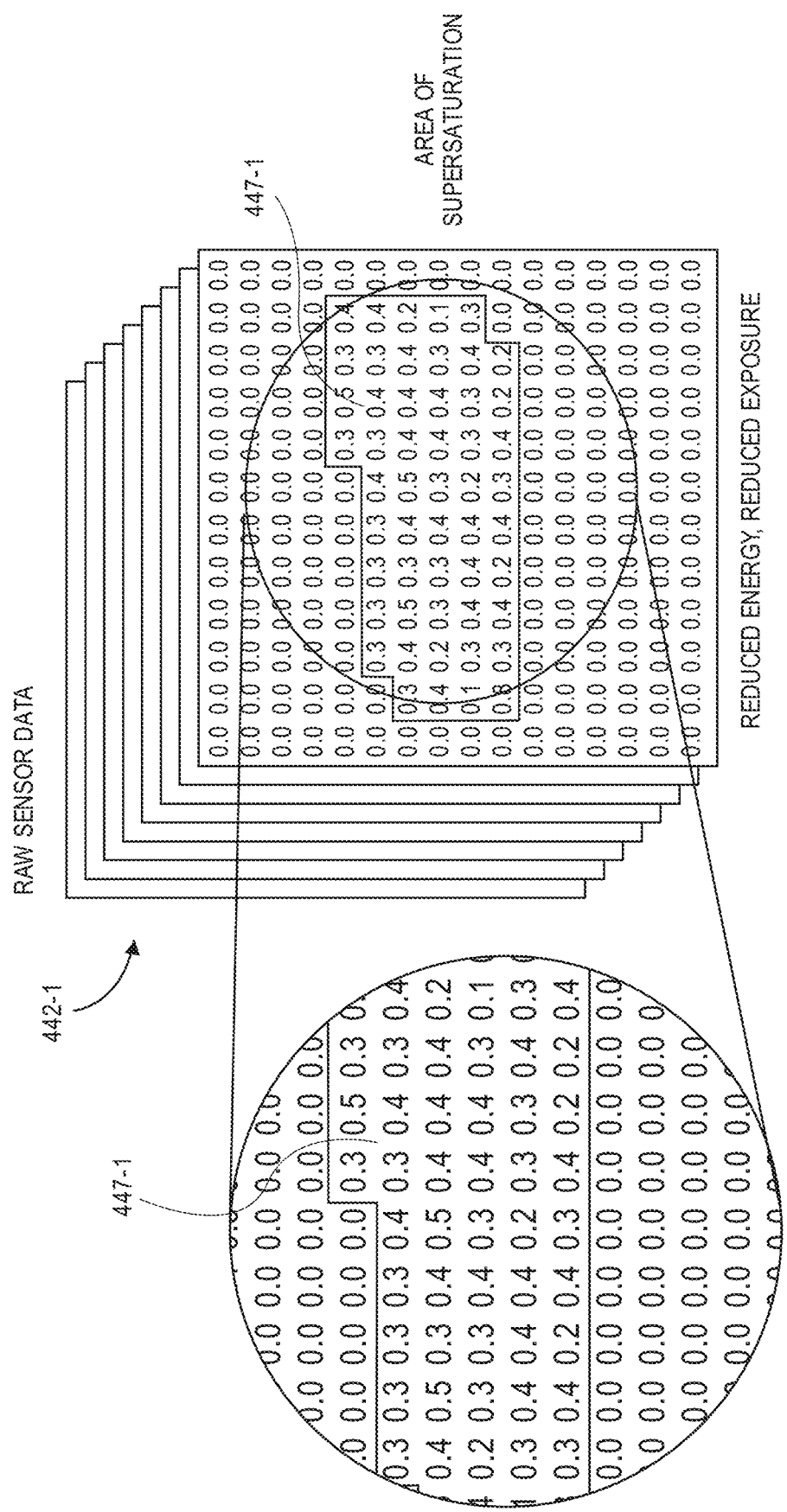

As is shown in FIG. 4F, a portion 447-1 of the set of raw sensor data 442-1 corresponding to the corrupted pixels of the raw sensor data 440-5 is identified, e.g., with respect to coordinates of a Cartesian coordinate plane. Because the raw sensor data 442-1 was captured at reduced illumination energies and for reduced exposure times, however, a balance of the set of raw sensor data 442-1 other than the portion 447-1 corresponding to the corrupted pixels of the raw sensor data 440-5 has low or insignificant values. As is shown in FIG. 4G, the portion 447-1 of the set of raw sensor data 442-1 is blended with a balance of the raw sensor data 440-5, not including the region 445-5, to generate a depth image 470. The depth image 470 of FIG. 4G does not include any distortions, corruptions or other adverse effects caused by the presence of the retroreflective material 496 within the field of view of the time-of-flight camera 410.

The systems and methods of the present disclosure may be utilized in any application in which retroreflective materials are present, or may be reasonably expected to be present, within a field of view of a time-of-flight camera. Referring to FIG. 5, views of aspects of one system for temporal high dynamic range imaging using time-of-flight cameras in accordance with embodiments of the present disclosure are shown. Except where otherwise noted, reference numerals preceded by the number "5" shown in FIG. 5 indicate components or features that are similar to components or features having reference numerals preceded by the number "4" shown in FIGS. 4A through 4G, by the number "2" shown in FIG. 2 or by the number "1" shown in FIGS. 1A through 1G.

As is shown in FIG. 5, an aerial vehicle 505 approaches a landing area 592 having an operating surface 594 marked by a retroreflective material 596 (e.g., a tape, a layer of paint or another substrate having retroreflective properties). Where the aerial vehicle 505 relies on a time-of-flight camera 510 to determine ranges to the landing area 592 during an approach, or whether the landing area 592 is clear to land on the operating surface 594, the time-of-flight camera 510 may capture raw sensor data in a low dynamic range imaging mode at standard energies and for standard durations, and detect the presence of the retroreflective material 596 within the raw sensor data, e.g., based on a number of saturated photoreceptors as determined by a number of corrupted pixels therein.

The time-of-flight camera 510 may then transition to a high dynamic ranging mode, and begin capturing sets of raw sensor data in an alternating fashion, e.g., at standard energies and for standard exposure durations, and at reduced energies and for reduced exposure durations. The time-of-flight camera 510 may then blend imaging data 550 generated from sets of raw sensor data captured at standard energies and for standard durations with imaging data 565 generated from sets of raw sensor data captured at reduced energies and for reduced exposure durations to generate depth images 570 of the landing area 592 that do not include any distortions, corruptions or other adverse effects of the retroreflective material 596 therein. The aerial vehicle 505 may rely on the depth images 570 when approaching the landing area 592, and may rely on the depth images 570 to determine whether any objects are present on the horizontal surface 592 during its approach, or to take any actions regarding the presence of the objects, e.g., slowing or delaying a descent, or aborting a descent, without fear that the retroreflective material 596 defining the landing area 592 may distort or corrupt any depth images generated from the raw sensor data captured by the time-of-flight camera 510. One or more control instructions or signals may be generated for the aerial vehicle 505, such as an instruction or signal to land the aerial vehicle 505 where the landing area 592 is determined to be clear, or, alternatively, an instruction or signal to delay or abort a landing where the aerial vehicle 505 is determined to be not clear, based on the depth images 570.

Figure 6:
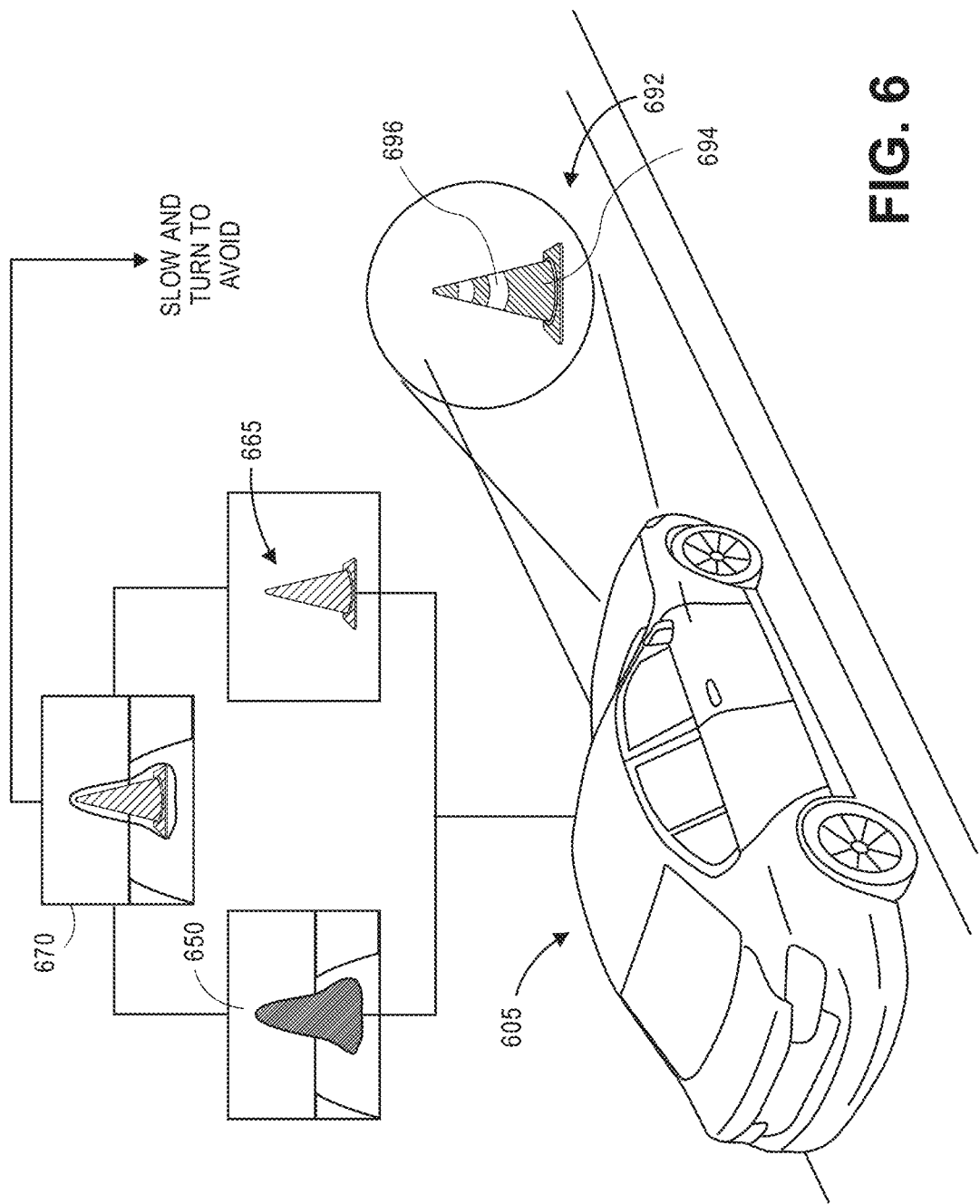
FIG. 6 is a view of aspects of one system for temporal high dynamic range imaging using time-of-flight cameras in accordance with embodiments of the present disclosure.

Similarly, referring to FIG. 6, views of aspects of one system for temporal high dynamic range imaging using time-of-flight cameras in accordance with embodiments of the present disclosure are shown. Except where otherwise noted, reference numerals preceded by the number "6" shown in FIG. 6 indicate components or features that are similar to components or features having reference numerals preceded by the number "5" shown in FIG. 5, by the number "4" shown in FIGS. 4A through 4E, by the number "2" shown in FIG. 2 or by the number "1" shown in FIGS. 1A through 1G.

As is shown in FIG. 6, a vehicle 605 (viz., an automobile, which may be autonomous or operated by one or more humans) traveling on a roadway 692 approaches a safety cone 694 or other obstruction. The safety cone 694 has a band 696 of a retroreflective material that is wrapped around a perimeter or circumference of the safety cone 694, at least in part. Where the vehicle 605 relies on a time-of-flight camera 610 to determine whether any objects are present in a direction of travel, e.g., forward of the vehicle 605, the time-of-flight camera 610 may capture raw sensor data at standard energies and for standard durations, and detect the presence of the band 696 of the retroreflective material wrapped around the safety cone 694 within the raw sensor data. The time-of-flight camera 610 may then transition to a high dynamic ranging mode, and begin capturing sets of raw sensor data in an alternating fashion, e.g., at standard energies and for standard exposure durations, and at reduced energies and for reduced exposure durations. The time-of-flight camera 610 may then blend imaging data 650 generated from sets of raw sensor data captured at standard energies and for standard durations with imaging data 665 generated from sets of raw sensor data captured at reduced energies and for reduced exposure durations to generate depth images 670 of the safety cone 694 that do not include any distortions, corruptions or other adverse effects of the band 696 of retroreflective material therein. The vehicle 605 may rely on the depth images 670 to determine whether any objects are present along its direction of travel, and to take one or more actions upon detecting the safety cone 694 or any other objects, e.g., reporting the presence of the objects to an operator of the vehicle 605, automatically causing the vehicle 605 to slow or maneuver to avoid the objects, or the like, regardless of whether the objects are covered by or formed from retroreflective materials.

Although some of the embodiments disclosed herein reference the use of time-of-flight cameras in fulfillment centers or like environments, or aboard autonomous mobile robots or unmanned aerial vehicles, those of ordinary skill in the pertinent arts will recognize that the systems and methods disclosed herein are not so limited, and may be utilized in connection with time-of-flight cameras that are provided for any intended industrial, commercial, recreational or other use.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in the flow chart of FIG. 3, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

The applicant acknowledges and wishes to thank Gavin, son of the counsel who prepared this application for patent, for his participation in the generation of FIG. 4C. Gavin's assistance is gratefully appreciated.

References herein to "standard" or "reduced" energy levels or exposure times are used in a relative sense with respect to one another, e.g., where standard energy levels are greater than reduced energy levels, and where standard exposure times are greater than reduced exposure times, and do not necessary imply a specific energy level or exposure time. Moreover, references to "energy" or "energy levels" and "power" or "power levels" may be used interchangeably herein, e.g., to refer to illumination energies (or illumination energy levels) and illumination powers (or illumination power levels).

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations.

For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A method comprising:
    capturing first data by a sensor of a time-of-flight camera, wherein the first data is captured with at least a portion of the sensor exposed to light reflected from at least a portion of a scene illuminated with a first level of light for a first period of time;
    determining, based at least in part on the first data, that an object having at least one retroreflective surface is located on the scene during at least a portion of the first period of time; and
    in response to determining that the object having the at least one retroreflective surface is located on the scene during at least the portion of the first period of time based at least in part on the first data,
        capturing second data by the sensor, wherein the second data is captured with at least the portion of the sensor exposed to light reflected from the portion of the scene illuminated with a second level of light for a second period of time; and
        generating a depth image based at least in part on at least a first portion of the first data and at least a second portion of the second data,
    wherein the first portion of the first data is a balance of the first data not corresponding to the object having the at least one retroreflective surface and a buffer around the object,
    wherein the second portion of the second data corresponds to at least the object having the at least one retroreflective surface and the buffer around the object,
    wherein the first level of light is greater than the second level of light, and
    wherein the first period of time is longer than the second period of time.

2. The method of claim 1, wherein the sensor comprises a plurality of photoreceptors,
    wherein the first data comprises first values for each of the plurality of photoreceptors corresponding to exposure of the sensor to the light reflected from the portion of the scene during the first period of time, and
    wherein determining that the object having the at least one retroreflective surface is located on the scene during at least the portion of the first period of time based at least in part on the first data comprises:
        identifying a number of the photoreceptors having first values above a first threshold during at least the first period of time based at least in part on the first data; and
        determining that the number of the photoreceptors exceeds a second threshold,
    wherein each of the number of the photoreceptors is within a portion of the sensor corresponding to the object having the at least one retroreflective surface and the buffer around the object.

3. The method of claim 2, wherein the second threshold is ten photoreceptors.

4. The method of claim 1,
    wherein the sensor comprises a plurality of photoreceptors,
    wherein the first data comprises a predetermined number of frames of sensor data captured during the first period of time, and
    wherein determining that the object having at least one retroreflective surface is located on the scene during at least a portion of the first period of time based at least in part on the first data comprises:
        identifying, for each of the predetermined number of frames of sensor data, a number of photoreceptors having first values that exceed a first predetermined threshold based at least in part on the first data, wherein each of the number of photoreceptors is within a portion of the sensor corresponding to the object having the at least one retroreflective surface and the buffer around the object; and
        determining, for each of the predetermined number of frames of sensor data, that the number of the first values exceeds a second predetermined threshold.

5. The method of claim 1, wherein generating the depth image comprises:
    identifying a third portion of the first data corresponding to the object having the at least one retroreflective surface and the buffer around the object;
    determining that the second portion of the second data corresponds to at least the third portion of the first data; and
    blending the first portion of the first data and the second portion of the second data.

6. The method of claim 1, wherein the illuminator comprises a continuous-wave infrared light source,
    wherein the sensor comprises a plurality of photoreceptors,
    wherein capturing the first data by the sensor comprises:
        receiving, by the sensor, the light reflected from the scene at a first plurality of times during the first period of time, wherein each of the first plurality of times corresponds to a phase angle between an illumination of the scene and a reflection of the light from the scene; and
        storing a first plurality of frames of the first data captured by the sensor during the first period of time, wherein each of the first plurality of frames comprises values for each of the plurality of photoreceptors at one of the first plurality of times, and
    wherein determining that the object having at least one retroreflective surface is located on the scene during at least the portion of the first period of time comprises:
        determining, for each of the plurality of frames, a number of photoreceptors having a value greater than a first threshold; and
        determining, for each of the plurality of frames, that the number of photoreceptors having the value above the first threshold is not less than a second threshold, wherein each of the number of photoreceptors is within a portion of the sensor corresponding to the object having the at least one retroreflective surface and the buffer around the object.

7. The method of claim 6, wherein each of the first plurality of times corresponds to a phase angle of zero, ninety, one hundred eighty or two hundred seventy degrees.

8. The method of claim 1, wherein capturing the first data by the time-of-flight camera comprises:
illuminating at least the portion of the scene by an illuminator associated with the sensor at a first modulation frequency during the first period of time, wherein the first data is captured during the illumination of at least the portion of the scene by the illuminator at the first modulation frequency;
illuminating at least the portion of the scene by the illuminator at a second modulation frequency during the first period of time; and
capturing third data by the sensor during the illumination of at least the portion of the scene by the illuminator at the second modulation frequency, wherein the third data comprises at least one value captured during the first period of time, and
wherein that the object having the at least one retroreflective surface is located on the scene during at least the portion of the first period of time is determined based at least in part on the first data and the third data.

9. The method of claim 1, wherein capturing the second data by the sensor comprises:
illuminating the portion of the scene by a pulsed infrared light source at a second time during the second period of time;
measuring electrical charges applied to each of a plurality of photoreceptors of the sensor during the second period of time; and
determining times at which the electrical charges are applied to each of the plurality of photoreceptors during the second period of time,
wherein the depth image is generated based at least in part on a product of a speed of light and a difference between the second time and one of the times at which an electrical charge was applied to one of the plurality of photoreceptors in at least the portion of the sensor.

10. The method of claim 1, wherein capturing the first data by the sensor comprises:
illuminating the scene by an illuminator at a first energy level for the first period of time, wherein the first energy level is within a range of approximately five watts to approximately ten watts, and
wherein capturing the second data by the sensor comprises:
illuminating the scene by the illuminator at a second energy level for the second period of time, wherein the second energy level is less than five watts.

11. The method of claim 1, wherein the first period of time is within a range of approximately five hundred microseconds to approximately two thousand microseconds, and
wherein the second period of time is less than five hundred microseconds.

12. The method of claim 1, wherein the time-of-flight camera is mounted to a vehicle, and
wherein the field of view of the time-of-flight camera extends in a direction of travel of the vehicle.

13. The method of claim 1, wherein the time-of-flight camera is mounted in a materials handling facility with at least one storage unit within the field of view.

* * * * *